US007502370B2

(12) United States Patent
Pettey

(10) Patent No.: US 7,502,370 B2
(45) Date of Patent: *Mar. 10, 2009

(54) NETWORK CONTROLLER FOR OBTAINING A PLURALITY OF NETWORK PORT IDENTIFIERS IN RESPONSE TO LOAD-STORE TRANSACTIONS FROM A CORRESPONDING PLURALITY OF OPERATING SYSTEM DOMAINS WITHIN A LOAD-STORE ARCHITECTURE

(75) Inventor: Christopher J. Pettey, Cedar Park, TX (US)

(73) Assignee: Nextio Inc., Austin, TX (US)

( * ) Notice: Subject to any disclaimer, the term of this patent is extended or adjusted under 35 U.S.C. 154(b) by 612 days.

This patent is subject to a terminal disclaimer.

(21) Appl. No.: 11/045,869

(22) Filed: Jan. 27, 2005

(65) Prior Publication Data
US 2005/0157754 A1 Jul. 21, 2005

Related U.S. Application Data

(63) Continuation-in-part of application No. 10/757,714, filed on Jan. 14, 2004, now Pat. No. 7,046,668, said (Continued)

(60) Provisional application No. 60/541,673, filed on Feb. 4, 2004, provisional application No. 60/555,127, filed on Mar. 22, 2004, provisional application No. 60/575, 005, filed on May 27, 2004, provisional application No. 60/588,941, filed on Jul. 19, 2004, provisional application No. 60/589,174, filed on Jul. 19, 2004, provisional application No. 60/615,775, filed on Oct. 4, 2004, provisional application No. 60/440,788, filed on Jan. 21, 2003, provisional application No. 60/440, 789, filed on Jan. 21, 2003, provisional application No. 60/464,382, filed on Apr. 18, 2003, provisional application No. 60/491,314, filed on Jul. 30, 2003, provisional application No. 60/515,558, filed on Oct. 29, 2003, provisional application No. 60/523,522, filed on Nov. 19, 2003.

(51) Int. Cl.
*G06F 13/10* (2006.01)

(52) U.S. Cl. .............. 370/389; 710/8; 710/62; 710/305; 709/220; 711/100

(58) Field of Classification Search ................ 370/355, 370/389, 469; 711/1, 200; 710/3, 8, 9, 10, 710/62, 305, 306
See application file for complete search history.

(56) References Cited

U.S. PATENT DOCUMENTS 4,058,672 A 11/1977 Crager et al.

(Continued)

FOREIGN PATENT DOCUMENTS

EP 0574691 A 12/1993

(Continued)

OTHER PUBLICATIONS

Koellner, Gregory. "NPIV Functionality Profile." Presentation, Jun. 5, 2002. Presentation # T11/02-340v0. Text # T11/02-338v0. www.t11.org. pp. 1-7.*

(Continued)

*Primary Examiner*—Wing F Chan
*Assistant Examiner*—Matthew Campbell
(74) *Attorney, Agent, or Firm*—E. Alan Davis

(57) ABSTRACT

A controller shareable by a plurality of operating system domains (OSDs) for communication on a network is disclosed. The controller includes a port for coupling to the network. The port transceives packets with the network for each of the plurality of OSDs. The controller also includes a plurality of replicated programming interfaces that each receive from a respective one of the plurality of OSDs a request to obtain a port ID for the port from the network. The controller obtains from the network a distinct port ID for each of the plurality of OSDs in response to the respective request. The request comprises one or more load-store transactions. In one embodiment, the controller is a shared Fiber Channel controller.

21 Claims, 17 Drawing Sheets

Related U.S. Application Data

(63) application No. 11/045,869 and a continuation-in-part of application No. 10/757,713, filed on Jan. 14, 2004, is a continuation-in-part of application No. 10/757,711, filed on Jan. 14, 2004, now Pat. No. 7,103,064, said application No. 11/045,869 is a continuation-in-part of application No. 10/802,532, filed on Mar. 16, 2004, which is a continuation-in-part of application No. 10/757,713, and a continuation-in-part of application No. 10/757,711, and a continuation-in-part of application No. 10/757,714, said application No. 11/045,869 is a continuation-in-part of application No. 10/827,622, filed on Apr. 19, 2004, now Pat. No. 7,219,183, and a continuation-in-part of application No. 10/802,532, said application No. 11/045,869 is a continuation-in-part of application No. 10/827,620, filed on Apr. 19, 2004, which is a continuation-in-part of application No. 10/802,532, said application No. 11/045,869 is a continuation-in-part of application No. 10/827,117, filed on Apr. 19, 2004, now Pat. No. 7,188,209, which is a continuation-in-part of application No. 10/802,532, said application No. 11/045,869 is a continuation-in-part of application No. 10/864,766, filed on Jun. 9, 2004, which is a continuation-in-part of application No. 10/757,714, and a continuation-in-part of application No. 10/757,713, and a continuation-in-part of application No. 10/757,711, and a continuation-in-part of application No. 10/802,532, said application No. 11/045,869 is a continuation-in-part of application No. 10/909,254, filed on Jul. 30, 2004, which is a continuation-in-part of application No. 10/757,714, and a continuation-in-part of application No. 10/757,713, and a continuation-in-part of application No. 10/757,711, and a continuation-in-part of application No. 10/802,532, and a continuation-in-part of application No. 10/864,766, and a continuation-in-part of application No. 10/827,622, and a continuation-in-part of application No. 10/827,620, and a continuation-in-part of application No. 10/827,117, said application No. 11/045,869 is a continuation-in-part of application No. 10/972,669, filed on Oct. 25, 2004, which is a continuation-in-part of application No. 10/827,622, and a continuation-in-part of application No. 10/827,620, and a continuation-in-part of application No. 10/827,117.

U.S. PATENT DOCUMENTS

| Patent No. | | Date | Inventor |
|---|---|---|---|
| 5,280,614 | A | 1/1994 | Munroe et al. |
| 5,414,851 | A * | 5/1995 | Brice et al. ............ 718/104 |
| 5,581,709 | A | 12/1996 | Ito et al. |
| 5,590,285 | A | 12/1996 | Krause et al. |
| 5,600,805 | A | 2/1997 | Fredericks et al. |
| 5,623,666 | A | 4/1997 | Pike et al. |
| 5,633,865 | A | 5/1997 | Short |
| 5,758,125 | A | 5/1998 | Misinai et al. |
| 5,761,669 | A | 6/1998 | Montague et al. |
| 5,790,807 | A | 8/1998 | Fishler et al. |
| 5,812,843 | A | 9/1998 | Yamazaki et al. |
| 5,909,564 | A | 6/1999 | Alexander et al. |
| 5,926,833 | A | 7/1999 | Rasoulian et al. |
| 6,009,275 | A | 12/1999 | DeKoning et al. |
| 6,014,669 | A | 1/2000 | Slaughter et al. |
| 6,044,465 | A | 3/2000 | Dutcher et al. |
| 6,078,964 | A | 6/2000 | Ratcliff et al. |
| 6,112,263 | A | 8/2000 | Futral |
| 6,128,666 | A | 10/2000 | Muller et al. |
| 6,141,707 | A | 10/2000 | Halligan et al. |
| 6,167,052 | A | 12/2000 | McNeill et al. |
| 6,240,467 | B1 | 5/2001 | Beardsley et al. |
| 6,247,077 | B1 | 6/2001 | Muller et al. |
| 6,343,324 | B1 | 1/2002 | Hubis et al. |
| 6,421,711 | B1 | 7/2002 | Blumenau et al. |
| 6,484,245 | B1 | 11/2002 | Sanada et al. |
| 6,496,880 | B1 | 12/2002 | Ma et al. |
| 6,507,896 | B2 | 1/2003 | Sanada et al. |
| 6,510,496 | B1 | 1/2003 | Tarui et al. |
| 6,523,096 | B2 | 2/2003 | Sanada et al. |
| 6,535,964 | B2 | 3/2003 | Sanada et al. |
| 6,542,919 | B1 | 4/2003 | Wendorf et al. |
| 6,556,580 | B1 | 4/2003 | Wang et al. |
| 6,615,336 | B1 | 9/2003 | Chen et al. |
| 6,640,206 | B1 | 10/2003 | Callender et al. |
| 6,662,254 | B1 | 12/2003 | Tal et al. |
| 6,665,304 | B2 | 12/2003 | Beck et al. |
| 6,678,269 | B1 | 1/2004 | Michels et al. |
| 6,728,844 | B2 | 4/2004 | Sanada et al. |
| 6,742,090 | B2 | 5/2004 | Sanada et al. |
| 6,745,281 | B1 | 6/2004 | Saegusa |
| 6,760,793 | B2 | 7/2004 | Kelley et al. |
| 6,772,270 | B1 | 8/2004 | Kurpanek |
| 6,779,071 | B1 | 8/2004 | Kallat et al. |
| 6,820,168 | B2 | 11/2004 | Tanaka et al. |
| 6,823,458 | B1 | 11/2004 | Lee et al. |
| 6,834,326 | B1 | 12/2004 | Wang et al. |
| 6,859,825 | B1 | 2/2005 | Williams |
| 6,877,073 | B2 | 4/2005 | Sanada et al. |
| 6,918,060 | B2 | 7/2005 | Fanning |
| 6,961,761 | B2 * | 11/2005 | Masuyama et al. ........ 709/220 |
| 7,013,353 | B2 | 3/2006 | Parthasarathy et al. |
| 7,231,486 | B2 | 6/2007 | Ajanovic et al. |
| 2001/0032280 | A1 | 10/2001 | Osakada et al. |
| 2002/0026558 | A1 | 2/2002 | Reuter et al. |
| 2002/0027906 | A1 | 3/2002 | Athreya et al. |
| 2002/0029319 | A1 | 3/2002 | Robbins et al. |
| 2002/0052914 | A1 | 5/2002 | Zalewski et al. |
| 2002/0072892 | A1 | 6/2002 | Shirley |
| 2002/0078271 | A1 | 6/2002 | Berry |
| 2002/0099901 | A1 | 7/2002 | Tanaka et al. |
| 2002/0126693 | A1 | 9/2002 | Stark et al. |
| 2002/0172195 | A1 | 11/2002 | Pekkala et al. |
| 2002/0186694 | A1 | 12/2002 | Mahajan et al. |
| 2003/0069975 | A1 | 4/2003 | Abjanic et al. |
| 2003/0069993 | A1 | 4/2003 | Na et al. |
| 2003/0079055 | A1 | 4/2003 | Chen |
| 2003/0091037 | A1 | 5/2003 | Latif et al. |
| 2003/0112805 | A1 | 6/2003 | Stanton |
| 2003/0126202 | A1 | 7/2003 | Watt |
| 2003/0131105 | A1 | 7/2003 | Czieger et al. |
| 2003/0158992 | A1 | 8/2003 | Ajanovic et al. |
| 2003/0163341 | A1 | 8/2003 | Banerjee et al. |
| 2003/0200315 | A1 | 10/2003 | Goldenberg et al. |
| 2003/0200330 | A1 | 10/2003 | Oelke et al. |
| 2003/0204593 | A1 | 10/2003 | Brown et al. |
| 2003/0208531 | A1 | 11/2003 | Matters et al. |
| 2003/0208551 | A1 | 11/2003 | Matters et al. |
| 2003/0208631 | A1 | 11/2003 | Matters et al. |
| 2003/0208632 | A1 | 11/2003 | Rimmer |
| 2003/0208633 | A1 | 11/2003 | Rimmer |
| 2003/0212830 | A1 | 11/2003 | Greenblat et al. |
| 2003/0217183 | A1 | 11/2003 | Rimmer et al. |
| 2004/0003140 | A1 | 1/2004 | Rimmer |
| 2004/0013092 | A1 | 1/2004 | Betker et al. |
| 2004/0013124 | A1 | 1/2004 | Peebles et al. |
| 2004/0019714 | A1 | 1/2004 | Kelley et al. |
| 2004/0019726 | A1 | 1/2004 | Kelley et al. |
| 2004/0019729 | A1 | 1/2004 | Kelley et al. |
| 2004/0025166 | A1 * | 2/2004 | Adlung et al. ............ 719/310 |
| 2004/0054838 | A1 | 3/2004 | Hoese et al. |
| 2004/0068591 | A1 | 4/2004 | Workman et al. |
| 2004/0073712 | A1 | 4/2004 | Larson et al. |

| | | | |
|---|---|---|---|
| 2004/0073716 A1 | 4/2004 | Boom et al. | |
| 2004/0081104 A1 | 4/2004 | Pan et al. | |
| 2004/0088414 A1 | 5/2004 | Flynn et al. | |
| 2004/0098532 A1 | 5/2004 | Huang et al. | |
| 2004/0109460 A1 | 6/2004 | Banks et al. | |
| 2004/0111559 A1 | 6/2004 | Heil | |
| 2004/0117516 A1 | 6/2004 | Date | |
| 2004/0117536 A1 | 6/2004 | Franke et al. | |
| 2004/0117598 A1 | 6/2004 | Arimilli et al. | |
| 2004/0123014 A1 | 6/2004 | Schaefer et al. | |
| 2004/0128410 A1 | 7/2004 | Mayhew et al. | |
| 2004/0165588 A1 | 8/2004 | Pandya | |
| 2004/0213211 A1 | 10/2004 | Green | |
| 2004/0221047 A1 | 11/2004 | Grover et al. | |
| 2004/0233921 A1 | 11/2004 | Krieg et al. | |
| 2004/0249975 A1 | 12/2004 | Tuck et al. | |
| 2005/0044301 A1* | 2/2005 | Vasilevsky et al. | 711/1 |
| 2005/0050240 A1 | 3/2005 | Wilkins et al. | |
| 2005/0080982 A1* | 4/2005 | Vasilevsky et al. | 711/1 |
| 2005/0097271 A1 | 5/2005 | Davies et al. | |
| 2005/0114623 A1* | 5/2005 | Craddock et al. | 711/200 |
| 2005/0147117 A1 | 7/2005 | Pettey et al. | |
| 2005/0169258 A1* | 8/2005 | Millet et al. | 370/389 |
| 2005/0268137 A1 | 12/2005 | Pettey | |
| 2006/0018341 A1 | 1/2006 | Pettey et al. | |
| 2006/0018342 A1 | 1/2006 | Pettey et al. | |
| 2006/0092928 A1* | 5/2006 | Pike et al. | 370/355 |
| 2006/0184711 A1 | 8/2006 | Pettey et al. | |

FOREIGN PATENT DOCUMENTS

| | | |
|---|---|---|
| EP | 0935200 A1 | 11/1999 |
| EP | 1115064 A2 | 7/2001 |
| EP | 1376932 A2 | 1/2004 |
| JP | 2002084311 A | 3/2002 |
| JP | 2002183102 A | 6/2002 |
| WO | WO9419749 | 9/1994 |
| WO | WO9929071 A1 | 6/1999 |
| WO | WO03085535 A2 | 10/2003 |

OTHER PUBLICATIONS

Ajay V Bhatt. "Creating a Third Generation I/O Interconnect" Jun. 4, 2003 Intel, XP002354597 http://www.intel.com/technology/pciexpress/downloads/3rdGenWhitePaper.pdf retrieved on Nov. 15, 2005.
"PCI Express Base Specification." Revision 1.0. PCI-SIG. Apr. 28, 2002. pp. 17-18.
Mehta, Pranav. "Advanced Switching boosts PCI Express." EE Times. CommsDesign. Online Oct. 28, 2002. Retrieved from Internet Nov. 30, 2005. <http://www.commsdesign.com/design_corner/showArticle.jhtml?articleID=16505864>.
Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_Overview_-_Spring_IDF_2004_FINAL.pdf.
"XILINX, Designing Network Attached Storage Platform With Advanced Switching" (XP002328191). Sep. 16, 2003. Retrieved from the Internet: URL:http://www.asi-sig.org/education/usage/xilinx_storage_usage.pdf.
Karin S. Puranik: "Advanced Switching Extends PCI Express" XCell Journal, (XP002328192). Retrieved from the Internet: URL:www.xilinx.com/publications/xcellonline/xcell_47/xc_pdf/xc_pcix47.pdf.
Anonymous: "Fabrics and Application Characteristics for AdvancedTCA Architectures" Intel Technology Journal, vol. 07, No. 04, Nov. 14, 2003 (XP002328193), ISSN: 1535-864X. Retrieved from the Internet: URL:www.intel.com/technology/itj/2003/volume07issue04/art02_fabrics/vol7iss4art02.pdf.
David Mayhew et al. "PCI Express and Advanced Switching: Evolutionary Path to Building Next Generation Interconnects" High Performance Interconnects, 2003, Proceedings. 11th Symposium on Aug. 20-22, 2003, Piscataway, NJ, USA. IEEE, Aug. 20, 2003, pp. 21-29, (XP010657970). ISBN: 0-7695-2012-X.
PCI Express Base Specificattion. Rev. 1.0. Apr. 29, 2002.
Cohen et al. "PCI Express Architecture Power Management." Rev 1.1. Nov. 8, 2002.
01-627v0(N Port ID Virtualization).pdf N_Port ID Virtualization Presentation, by Robert Dugan, Giles. Frazier, IBM Corporation, obtained from ftp://ftp.t11.org/t11/pub/fc/fs/01-627v0 on Nov. 4, 2004.
02-008v0(N Port ID Virtualization #2).pdf N_Port Virtualizatio: Proposed FC-FS Modifications, by Robert Dugan, Giles Frazier, IBM Corporation, obtained from ftp://ftp.t11.org/t11/pbu/fc/fs/02-008v0.pdf on Nov. 4, 2004.
Pages from INCIS 373 2003 (FC-FS specification).pdf pp. 307 & 311 from ANSI INCITS 373-2003, Fibre Channel—Framing and signaling (FC-FS), Approved Oct. 22, 2003.
Forouzan, Behrouz A. "Data Communications and Networking, Third Edition." pp. 528-536. McGraw-Hill, 2004, 2001, 1998.
Seifert, Rich. "The Switch Book, The Complete Guide to LAN Switching Technology." pp. 431-473. John Wiley & Sons. 2000.
"Catalyst 3550 Multilayer Switch Software Configuration Guide." Chapter 13, pp. 1-14. Cisco Systems. Apr. 2002.
"802.1Q, IEEE Standards for Local and Metropolitan Area Networks, Virtual Bridged Local Area Networks." IEEE. May 7, 2003.
Holland et al. "Dynamic Switching between One-to-Many Download Methods I "ALL-IP" Cellular Networks" (abstract only) Publication date: May-Jun. 2006.
Mellanox Technologies, Inc. "Understanding PCI Bus, PCI-Express and Infiniband Architecture (White Paper)." Document No. 2006WP. Mellanox Technologies, Inc. Santa Clara, CA, US.
Kleiman et al. "SunOS on SPARC." (abstract only) Publication Date: Feb. 29-Mar. 3, 1988.
Marek Piekarski. "Advanced Switching Interconnect and Blade Server Re-Purposing in the Data Center." Aug. 21, 2004. XP002341367. URL: http://www.asi-sig.org/education/white papers/ASWhitePaper_Final_Copy.pdf.
"Network Interface Controller." FOLDOC—Free On-Line Dictionary of Computing. Http://foldoc.org/index.cgi?query=network+interface+controller. Apr. 11, 2008.
INCITS working draft proporsed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.
PCI-SIG, PCI Local Bus Specification. Dec. 18, 1998. Revision 2.2, pp. 214-220. http://www.pcisig.com/home.
PCI-SIG, PCI Express Base Specification. Apr. 15, 2003. Revision 1.0a. pp. 27, 259-260. http://www.pcisig.com/home.
Koellner, Gregory. "NPIV Functionality Profile." Presentation, Jun. 5, 2002. Presentation # T11/02-340v0. Text # T11/02-338v0. www.t11.org.

* cited by examiner

Fig. 3
Shared Fibre Channel Controller: Virtual Arbitrated Loop Mode
Physical View
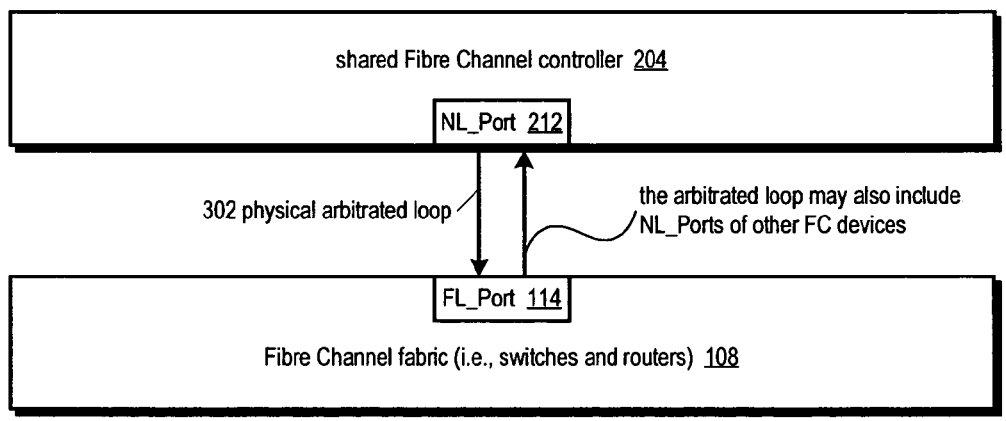
Logical View
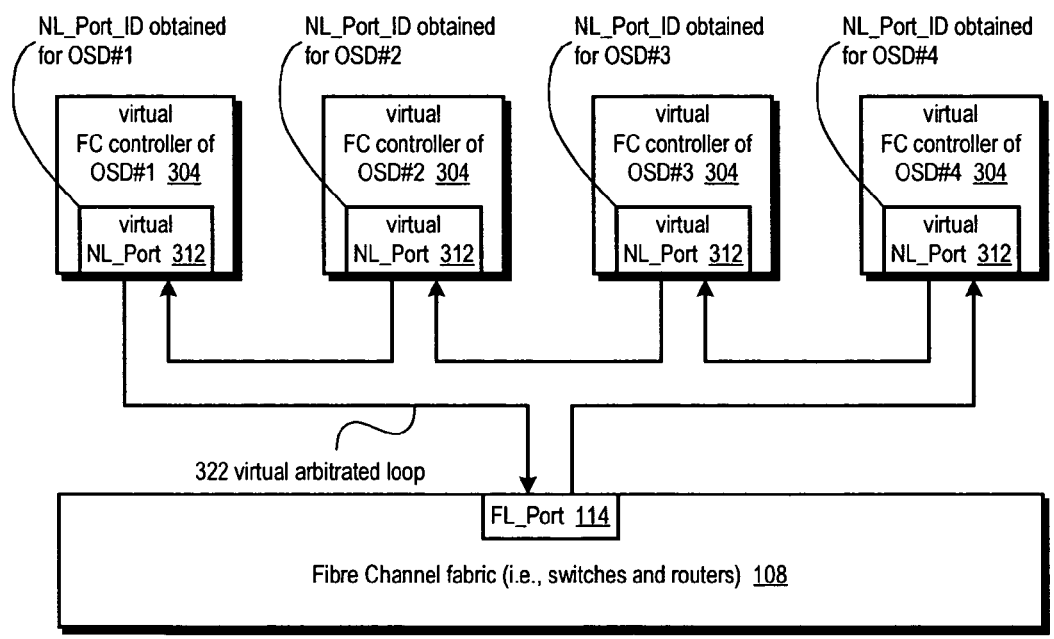

Mapping Table

NL_Port ID Determination for Virtual Arbitrated Loop Mode

Fig. 7
Shared Fibre Channel Controller: Multiple N_Port_ID Assignment Mode
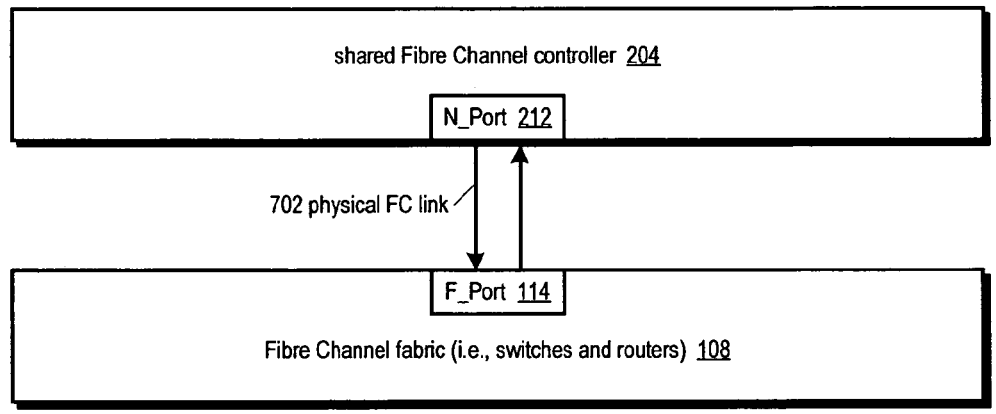
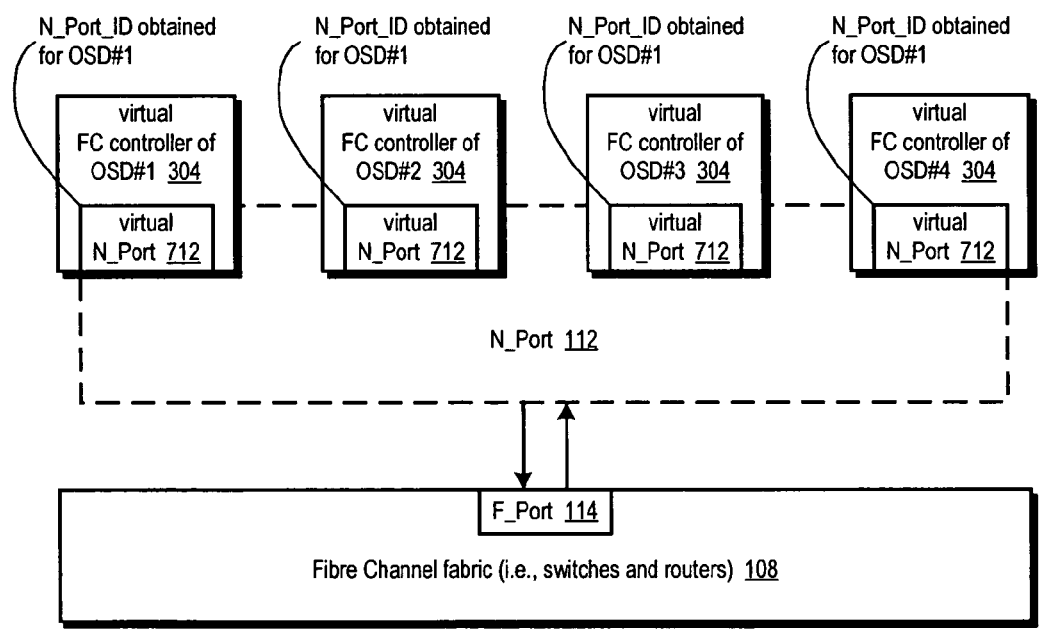

Nx_Port Logout in Response to Removal of OSD

<u>Received Frame to I/O Request Block Association in Conventional FC Controller</u>

*Received Frame to I/O Request Block Association in Shared FC Controller*

*N_Port_ID Determination for Multiple N_Port_ID Assignment Mode*
*(Alternate Embodiment)*

Computer System with Fibre Channel Controller Shared by Operating System Domains PI   Protocol ID Field
OSD  OS Domain Number
R    Reserved

NETWORK CONTROLLER FOR OBTAINING A PLURALITY OF NETWORK PORT IDENTIFIERS IN RESPONSE TO LOAD-STORE TRANSACTIONS FROM A CORRESPONDING PLURALITY OF OPERATING SYSTEM DOMAINS WITHIN A LOAD-STORE ARCHITECTURE

CROSS REFERENCE TO RELATED APPLICATION(S)

This application claims the benefit of the following pending U.S. Provisional Applications, and is filed by an inventor named in each of the Applications, and which are hereby incorporated by reference for all purposes:

| SERIAL NO. | FILING DATE | TITLE |
| --- | --- | --- |
| 60/541673 | Feb. 4, 2004 | PCI SHARED I/O WIRE LINE PROTOCOL |
| 60/555127 | Mar. 22, 2004 | PCI EXPRESS SHARED IO WIRELINE PROTOCOL SPECIFICATION |
| 60/575005 | May 27, 2004 | NEXSIS SWITCH |
| 60/588941 | Jul. 19, 2004 | SHARED I/O DEVICE ARCHITECTURE |
| 60/589174 | Jul. 19, 2004 | |
| 60/615775 | Oct. 4, 2004 | PCI EXPRESS SHARED IO WIRELINE PROTOCOL SPECIFICATION |

This application is a Continuation-in-Part (CIP) of the following pending U.S. Non-Provisional Patent Applications, and is filed by an inventor named in each of the Applications, and is assigned to a common assignee (NextIO Inc.) of each of the Applications, each of which is hereby incorporated by reference herein for all purposes:

Pending U.S. patent application Ser. Nos. 10/757,714, 10/757,713, and 10/757,711 each claim the benefit of U.S. Provisional Application Ser. No. 60/541,673 as well as the following U.S. Provisional Applications:

| SERIAL NO. | FILING DATE | TITLE |
| --- | --- | --- |
| 60/440788 | Jan. 21, 2003 | SHARED IO ARCHITECTURE |
| 60/440789 | Jan. 21, 2003 | 3GIO-XAUI COMBINED SWITCH |
| 60/464382 | Apr. 18, 2003 | SHARED-IO PCI COMPLIANT SWITCH |
| 60/491314 | Jul. 30, 2003 | SHARED NIC BLOCK DIAGRAM |
| 60/515558 | Oct. 29, 2003 | NEXSIS |
| 60/523522 | Nov. 19, 2003 | SWITCH FOR SHARED I/O FABRIC |

Pending U.S. patent application Ser. No. 10/802,532 claims the benefit of U.S. Provisional Application Ser. Nos. 60/464,382, 60/491,314, 60/515,558, 60/523,522, and 60/541,673, and is a continuation-in-part of U.S. patent application Ser. Nos. 10/757,714, 10/757,713, and 10/757,711.

Pending U.S. patent application Ser. Nos. 10/827,622, 10/827,620, and 10/827,117 each claim the benefit of U.S. Provisional Application Ser. No. 60/555,127 and are each a continuation-in-part of U.S. patent application Ser. No. 10/802,532.

Pending U.S. patent application Ser. No. 10/864,766 claims the benefit of U.S. Provisional Application Ser. Nos. 60/464,382, 60/491,314, 60/515,558, 60/523,522, 60/541, 673, and 60/555,127 and is a continuation-in-part of U.S. patent application Ser. Nos. 10/757,714, 10/757,713, 10/757, 711, and 10/802,532.

Pending U.S. patent application Ser. No. 10/909,254 claims the benefit of U.S. Provisional Application Ser. Nos. 60/491,314, 60/515,558, 60/523,522, 60/541,673, 60/555,

| SERIAL NO. | FILING DATE | TITLE |
| --- | --- | --- |
| 10/757714 now U.S. Pat. No. 7,046,668 | Jan. 14, 2004 | METHOD AND APPARATUS FOR SHARED I/O IN A LOAD-STORE FABRIC |
| 10/757713 | Jan. 14, 2004 | METHOD AND APPARATUS FOR SHARED I/O IN A LOAD-STORE FABRIC |
| 10/757711 now U.S. Pat. No. 7,103,064 | Jan. 14, 2004 | METHOD AND APPARATUS FOR SHARED I/O IN A LOAD-STORE FABRIC |
| 10/802532 | Mar. 16, 2004 | SHARED INPUT/OUTPUT LOAD-STORE ARCHITECTURE |
| 10/827622 now U.S. Pat. No. 7,219,183 | Apr. 19, 2004 | SWITCHING APPARATUS AND METHOD FOR PROVIDING SHARED I/O WITHIN A LOAD-STORE FABRIC |
| 10/827620 | Apr. 19, 2004 | SWITCHING APPARATUS AND METHOD FOR PROVIDING SHARED I/O WITHIN A LOAD-STORE FABRIC |
| 10/827117 now U.S. Pat. No. 7,188,209 | Apr. 19, 2004 | SWITCHING APPARATUS AND METHOD FOR PROVIDING SHARED I/O WITHIN A LOAD-STORE FABRIC |
| 10/864766 | Jun. 9, 2004 | METHOD AND APPARATUS FOR A SHARED I/O SERIAL ATA CONTROLLER |
| 10/909254 | Jul. 30, 2004 | METHOD AND APPARATUS FOR A SHARED I/O NETWORK INTERFACE CONTROLLER |
| 10/972669 | Oct. 25, 2004 | SWITCHING APPARATUS AND METHOD FOR LINK INITIALIZATION IN A SHARED I/O ENVIRONMENT |

127, 60/575,005, 60/588,941, and 60/589,174, and is a continuation-in-part of U.S. patent application Ser. Nos. 10/757,714, 10/757,713, 10/757,711, 10/802,532, 10/864,766, 10/827,622, 10/827,620, and 10/827,117.

Pending U.S. patent application Ser. No. 10/972,669 claims the benefit of U.S. Provisional Application Ser. Nos. 60/515,558, 60/523,522, 60/541,673, 60/555,127, 60/575,005, 60/588,941, 60/589,174, and 60/615,775, and is a continuation-in-part of U.S. patent application Ser. Nos. 10/827,622, 10/827,620, and 10/827,117.

This application is related to the following U.S. Patent Application, which is concurrently filed herewith and has the same inventor and is assigned to a common assignee (NextIO Inc.):

| SERIAL NO. | FILING DATE | TITLE |
| --- | --- | --- |
| 11/046/537 | Jan. 27, 2005 | FIBRE CHANNEL CONTROLLER SHAREABLE BY A PLURALITY OF OPERATING SYSTEM DOMAINS WITHIN A LOAD-STORE ARCHITECTURE |
| 11/045,870 | Jan. 27, 2005 | FIBRE CHANNEL CONTROLLER SHAREABLE BY A PLURALITY OF OPERATING SYSTEM DOMAINS WITHIN A LOAD-STORE ARCHITECTURE |
| 11/046,564 | Jan. 27, 2005 | FIBRE CHANNEL CONTROLLER SHAREABLE BY A PLURALITY OF OPERATING SYSTEM DOMAINS WITHIN A LOAD-STORE ARCHITECTURE |

FIELD OF THE INVENTION

This invention relates in general to the field of computer network architecture, and more specifically to an architecture to allow sharing and/or partitioning of network input/output (I/O) endpoint devices in a load-store fabric, particularly a shared Fibre Channel controller.

BACKGROUND OF THE INVENTION

Although the above referenced pending patent applications have been incorporated by reference, to assist the reader in appreciating the problem to which the present invention is directed, the Background of those applications is substantially repeated below.

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single microprocessor, such as a Pentium microprocessor, coupled to memory. Or, it might be as complex as two or more processors which share memory.

The interface between the processing complex and I/O is commonly known as the chipset. On the north side of the chipset (i.e., between the processing complex and the chipset) is a bus referred to as the HOST bus. The HOST bus is usually a proprietary bus designed to interface to memory, to one or more microprocessors within the processing complex, and to the chipset. On the south side of the chipset are a number of buses which connect the chipset to I/O devices. Examples of such buses include: ISA, EISA, PCI, PCI-X, and AGP.

I/O devices are devices that allow data to be transferred to or from the processing complex through the chipset, on one or more of the buses supported by the chipset. Examples of I/O devices include: graphics cards coupled to a computer display; disk controllers, such as Serial ATA (SATA) or Fiber Channel controllers (which are coupled to hard disk drives or other data storage systems); network controllers (to interface to networks such as Ethernet); USB and FireWire controllers which interface to a variety of devices from digital cameras to external data storage to digital music systems, etc.; and PS/2 controllers for interfacing to keyboards/mice. The I/O devices are designed to connect to the chipset via one of its supported interface buses. For example, modern computers typically couple graphic cards to the chipset via an AGP bus. Ethernet cards, SATA, Fiber Channel, and SCSI (data storage) cards, USB and FireWire controllers all connect to a PCI bus, and PS/2 devices connect to an ISA bus.

One skilled in the art will appreciate that the above description is general. However, what should be appreciated is that regardless of the type of computer, it will include a processing complex for executing instructions, an interface to I/O, and I/O devices to allow the processing complex to communicate with the world outside of itself. This is true whether the computer is an inexpensive desktop in a home, a high-end workstation used for graphics and video editing, or a clustered server which provides database support to hundreds within a large organization.

Also, although not yet referenced, a processing complex typically executes one or more operating systems (e.g., Microsoft Windows, Windows Server, Unix, Linux, Macintosh, etc.). This application therefore refers to the combination of a processing complex with one or more operating systems as an operating system domain (OSD). An OSD, within the present context, is a system load-store memory map that is associated with one or more processing complexes. Typically, present day operating systems such as Windows, Unix, Linux, VxWorks, Mac OS, etc., must comport with a specific load-store memory map that corresponds to the processing complex upon which they execute. For example, a typical x86 load-store memory map provides for both memory space and I/O space. Conventional memory is mapped to the lower 640 kilobytes (KB) of memory. The next higher 128 KB of memory are employed by legacy video devices. Above that is another 128 KB block of addresses mapped to expansion ROM. And the 128 KB block of addresses below the 1 megabyte (MB) boundary is mapped to boot ROM (i.e., BIOS). Both DRAM space and PCI memory are mapped above the 1 MB boundary. Accordingly, two separate processing complexes may be executing within two distinct OSDs, which typically means that the two processing complexes are executing either two instances of the same operating system or that they are executing two distinct operating systems. However, in a symmetrical multi-processing environment, a plurality of processing complexes may together be executing a single instance of an SMP operating system, in which case the plurality of processing complexes would be associated with a single OSD.

A problem that has been recognized by the present inventor is that the requirement to place a processing complex, interface and I/O within every computer is costly, and lacks modularity. That is, once a computer is purchased, all of the subsystems are static from the standpoint of the user. The ability to change a processing complex while still utilizing the interface and I/O is extremely difficult. The interface or chipset is typically so tied to the processing complex that swapping one without the other doesn't make sense. And, the I/O is typically integrated within the computer, at least for servers and business desktops, such that upgrade or modification of the I/O is either impossible or cost prohibitive.

An example of the above limitations is considered helpful. A popular network server designed by Dell Computer Corporation is the Dell PowerEdge 1750. This server includes one or more microprocessors designed by Intel (Xeon processors), along with memory (e.g., the processing complex). It has a server class chipset for interfacing the processing complex to I/O (e.g., the interface). And, it has onboard graphics for connecting to a display, onboard PS/2 for connecting a mouse/keyboard, onboard RAID control for connecting to data storage, onboard network interface controllers for connecting to 10/100 and 1 gig Ethernet; and a PCI bus for adding other I/O such as SCSI or Fiber Channel controllers. It is believed that none of the onboard features are upgradeable.

So, as mentioned above, one of the problems with this architecture is that if another I/O demand emerges, it is difficult, or cost prohibitive to implement the upgrade. For example, 10 gigabit Ethernet is on the horizon. How can this be easily added to this server? Well, perhaps a 10 gig Ethernet controller could be purchased and inserted onto the PCI bus. Consider a technology infrastructure that included tens or hundreds of these servers. To move to a faster network architecture requires an upgrade to each of the existing servers. This is an extremely cost prohibitive scenario, which is why it is very difficult to upgrade existing network infrastructures.

This one-to-one correspondence between the processing complex, the interface, and the I/O is also costly to the manufacturer. That is, in the example above, much of the I/O is manufactured on the motherboard of the server. To include the I/O on the motherboard is costly to the manufacturer, and ultimately to the end user. If the end user utilizes all of the I/O provided, then s/he is happy. But, if the end user does not wish to utilize the onboard RAID, or the 10/100 Ethernet, then s/he is still required to pay for its inclusion. This is not optimal.

Consider another emerging platform, the blade server. A blade server is essentially a processing complex, an interface, and I/O together on a relatively small printed circuit board that has a backplane connector. The blade is made to be inserted with other blades into a chassis that has a form factor similar to a rack server today. The benefit is that many blades can be located in the same rack space previously required by just one or two rack servers. While blades have seen market growth in some areas, where processing density is a real issue, they have yet to gain significant market share, for many reasons. One of the reasons is cost. That is, blade servers still must provide all of the features of a pedestal or rack server, including a processing complex, an interface to I/O, and I/O. Further, the blade servers must integrate all necessary I/O because they do not have an external bus which would allow them to add other I/O on to them. So, each blade must include such I/O as Ethernet (10/100, and/or 1 gig), and data storage control (SCSI, Fiber Channel, etc.).

One recent development to try and allow multiple processing complexes to separate themselves from I/O devices was introduced by Intel and other vendors. It is called Infiniband. Infiniband is a high-speed serial interconnect designed to provide for multiple, out of the box interconnects. However, it is a switched, channel-based architecture that is not part of the load-store architecture of the processing complex. That is, it uses message passing where the processing complex communicates with a Host-Channel-Adapter (HCA) which then communicates with all downstream devices, such as I/O devices. It is the HCA that handles all the transport to the Infiniband fabric rather than the processing complex. That is, the only device that is within the load-store domain of the processing complex is the HCA. What this means is that you have to leave the processing complex domain to get to your I/O devices. This jump out of the processing complex domain (the load-store domain) is one of the things that contributed to Infinibands failure as a solution to shared I/O. According to one industry analyst referring to Infiniband, "[i]t was overbilled, overhyped to be the nirvana for everything server, everything I/O, the solution to every problem you can imagine in the data center . . . but turned out to be more complex and expensive to deploy . . . because it required installing a new cabling system and significant investments in yet another switched high speed serial interconnect".

Thus, the inventor has recognized that separation between the processing complex and its interface, and I/O, should occur, but the separation must not impact either existing operating systems, software, or existing hardware or hardware infrastructures. By breaking apart the processing complex from the I/O, more cost effective and flexible solutions can be introduced.

Further, the inventor has recognized that the solution must not be a channel-based architecture, performed outside of the box. Rather, the solution should use a load-store architecture, where the processing complex sends data directly to (or at least architecturally directly) or receives data directly from an I/O device (such as a network controller, or data storage controller). This allows the separation to be accomplished without affecting a network infrastructure or disrupting the operating system.

Therefore, what is needed is an apparatus and method which separates the processing complex and its interface to I/O from the I/O devices.

Further, what is needed is an apparatus and method which allows processing complexes and their interfaces to be designed, manufactured, and sold, without requiring I/O to be included within them.

Additionally, what is needed is an apparatus and method which allows a single I/O device to be shared by multiple processing complexes.

Further, what is needed is an apparatus and method that allows multiple processing complexes to share one or more I/O devices through a common load-store fabric.

Additionally, what is needed is an apparatus and method that provides switching between multiple processing complexes and shared I/O.

Further, what is needed is an apparatus and method that allows multiple processing complexes, each operating independently, and having their own operating system domain, to view shared I/O devices as if the I/O devices were dedicated to them.

And, what is needed is an apparatus and method which allows shared I/O devices to be utilized by different processing complexes without requiring modification to the processing complexes existing operating systems or other software. Of course, one skilled in the art will appreciate that modification of driver software may allow for increased functionality within the shared environment.

The previously filed applications from which this application depends address each of these needs. However, in addition to the above, what is further needed is an I/O controller that can be shared by two or more operating system domains within a load-store architecture that dynamically obtains a distinct network port identifier for each of the operating system domains in response the operating system domains making a request via load-store transactions to the shared I/O controller to obtain a port identifier.

SUMMARY OF THE INVENTION

In one aspect, the present invention provides a controller shareable by a plurality of operating system domains (OSDs) for communication on a network. The sharable controller includes a port, for coupling to the network, configured to transceive packets with the network for each of the plurality of OSDs. The sharable controller also includes a plurality of replicated programming interfaces, coupled to the port. Each of the plurality of replicated programming interfaces is configured to receive from a respective one of the plurality of OSDs a request to obtain a port ID for the port from the network. The shared controller obtains from the network a distinct port ID for each of the plurality of OSDs in response to the respective request, wherein the request comprises one or more load-store transactions. In one embodiment, the shared controller is a shared Fibre Channel controller. In another embodiment, the shared controller is a shared Infini-Band controller.

In another aspect, the present invention provides a method for sharing a controller by a plurality of operating system domains (OSDs) for communication on a network. The controller has a port for coupling to the network and a plurality of replicated programming interfaces. The method includes receiving from each of the plurality of OSDs on a respective one of the plurality of replicated programming interfaces a respective request to obtain a port ID for the port from the network. Each respective request comprises one or more load-store transactions. The method also includes obtaining from the network a distinct port ID for each of the plurality of OSDs, in response to receiving each of the respective requests.

In another aspect, the present invention provides a blade server environment. The blade server environment includes a plurality of blade servers. The blade server environment includes a shared switch for coupling to the plurality of blade servers, and for providing communication between the plurality of blade servers and a downstream endpoint. The downstream endpoint includes a controller shareable by the plurality of blade servers for communication on a network. The shared controller includes a port, for coupling to the network, which transceives packets with the network for each of the plurality of blades. The shareable controller also includes a plurality of replicated programming interfaces, coupled to the port. Each of the plurality of replicated programming interfaces receives from a respective one of the plurality of blade servers a request to obtain a port ID for the port from the network. The shared controller obtains from the network a distinct port ID for each of the plurality of blade servers in response to the respective request. The respective requests comprise one or more load-store transactions.

Other features and advantages of the present invention will become apparent upon study of the remaining portions of the specification and drawings.

BRIEF DESCRIPTION OF THE DRAWINGS

FIG. 3 is a block diagram illustrating the shared FC controller of FIG. 2 operating in a virtual arbitrated loop mode to obtain multiple NL_Port_IDs for association with multiple OSDs according to the present invention.

FIG. 7 is a block diagram illustrating the shared FC controller of FIG. 2 employing the multiple N_Port_ID assignment mode to obtain multiple N_Port_IDs for association with multiple OSDs according to the present invention.

DETAILED DESCRIPTION

Although the present invention may be implemented in any of a number of load-store fabrics, the discussion below is provided with particular reference to PCI Express. One skilled in the art will appreciate that although embodiments of the present invention will be described within the context of PCI Express, a number of alternative, or yet to be developed load-store protocols might be used without departing from the spirit and scope of the present invention.

By way of background, Peripheral Component Interconnect (PCI) was developed in the early 1990's by Intel Corporation as a general I/O architecture to transfer data and instructions faster than the ISA architecture of the time. PCI has gone through several improvements since that time, with the latest proposal being PCI Express. In a nutshell, PCI Express is a replacement of the PCI and PCI-X bus specification to provide platforms with much greater performance, while using a much lower pin count. In particular, PCI and PCI-X are parallel bus architectures, whereas PCI Express is a serial architecture. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In addition, the PCI Express specification is managed and disseminated through the PCI Special Interest Group (SIG) found at www.pcisig.com.

This invention is also directed at describing a shared Fibre Channel (FC) controller. Fibre Channel controllers have existed to connect computers to Fibre Channel topologies, namely FC fabrics, arbitrated loops, and point-to-point links. However, Applicant is unaware of any FC controller that may be shared by multiple processing complexes as part of their load-store domain. While the present invention will be described with reference to interfacing to a FC fabric, one skilled in the art will appreciate that the teachings of the present invention are applicable to other types of computer networks.

Figure 1:
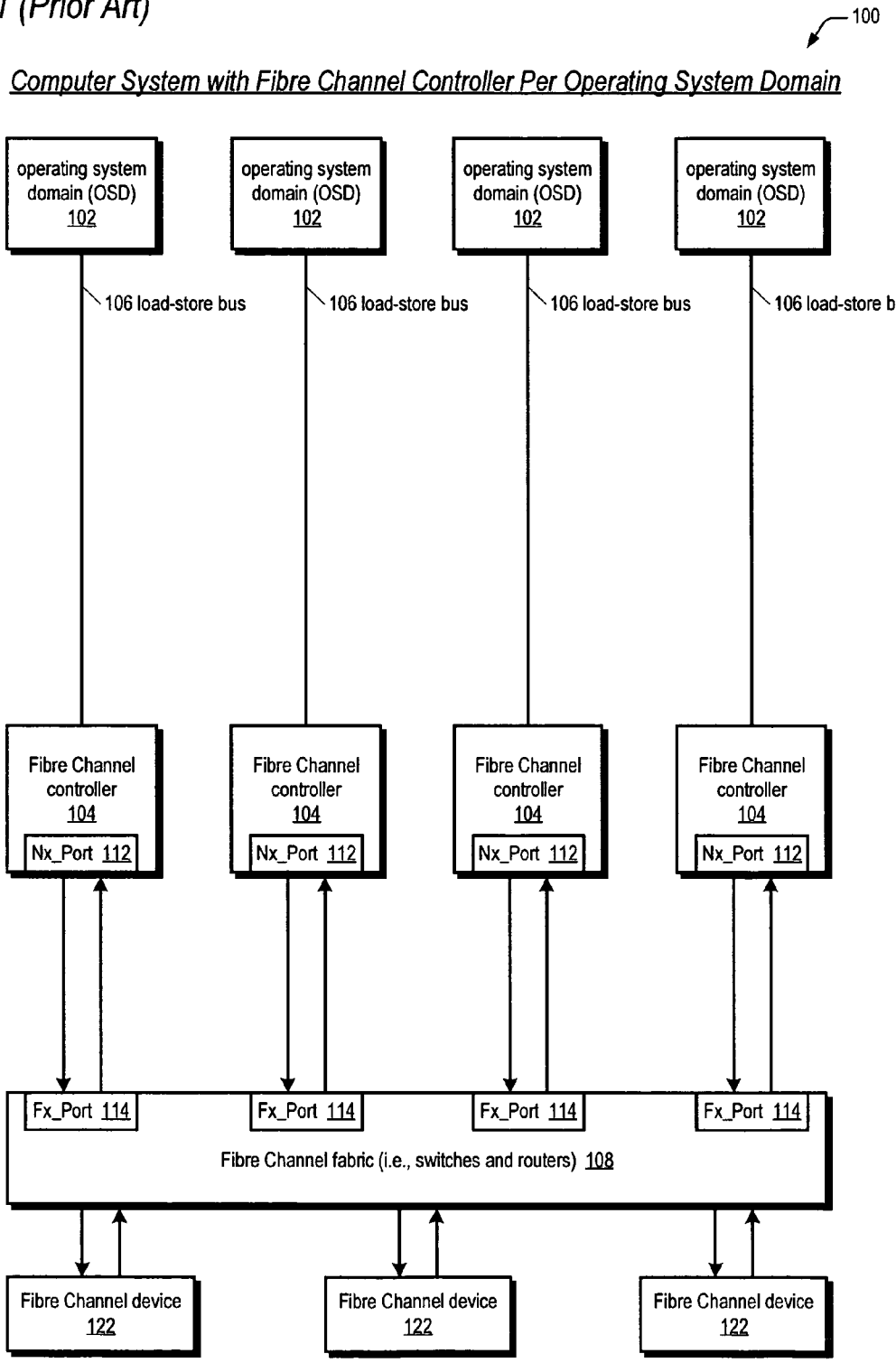
FIG. 1 is a block diagram illustrating a conventional computer system having conventional, i.e., non-shared, Fibre Channel FC controllers.

Referring now to FIG. 1, a block diagram illustrating a conventional computer system 100 having conventional, i.e., non-shared, Fibre Channel (FC) controllers 104 is shown. The computer system 100 includes a plurality of operating system domains (OSDs) 102 each coupled to a FC controller 104 by a load-store bus 106. The load-store buses 106 comprise local I/O buses, which may include, but are not limited to: an ISA bus, an EISA bus, a PCI bus, a PCI-X bus, a PCI-X2 bus, a CompactPCI bus, a PCI Express bus, a VME bus, a HyperTransport bus, a RapidIO bus, a VESA bus, an AGP bus, a 3GIO bus, a Futurebus, a MultiBus, and the like. Each of the FC controllers 104 is linked to a FC fabric 108 through which the FC controllers 104 perform I/O operations with FC devices 122, which are also linked to the FC fabric 108, in response to requests from their respective OSDs 102 to perform the I/O operations. The FC devices 122 may include, but are not limited to: disk drives; tape drives; optical storage devices, such as CD-ROM and DVD drives; host computers; mass storage controllers, such as redundant array of inexpensive disks (RAID) controllers; printers; and scanners. The FC fabric 108 may include FC switches and/or routers and may be part of a storage area network (SAN). Each FC controller 104 includes an Nx_Port 112 linked to a respective Fx_Port 114 of the FC fabric 108. As used herein, the term "Nx_Port" simply denotes either a FC N_Port or a FC NL_Port or a FC-Nx_Port. In particular, the term does not carry the restriction in the FC specifications that an Nx_Port may not be a private NL_Port. Similarly, the term "Fx_Port" simply denotes either a FC F_Port or a FC FL_Port or a FC Fx_Port.

Each OSD 102 comprises a system load-store memory map that is associated with one or more processing complexes executing an operating system. A processing complex comprises one or more microprocessors coupled to one or more memories. The term operating system should be understood to include device driver software unless otherwise indicated. The FC controllers 104 each include a programming interface, such as control/status registers (CSRs) and/or shared memory, within the system load-store memory map.

The OSDs 102 perform load-store transactions on the respective load-store buses 106 to the programming interfaces of their respective FC controllers 104 to issue requests to perform I/O operations with the FC devices 122. A load-store transaction comprises a load or store to memory space or a load-store transaction may comprise a load or store to I/O space. In particular, the OSD 102 device drivers control their respective FC controllers 104 by executing load and store instructions (e.g., Intel Architecture (IA) MOV instruction, MIPS Instruction Set Architecture (ISA) LW or SW instruction, etc.) that generate load-store transactions on the respective load-store bus 106. This is in contrast to, for example, a FC controller that is coupled to an OSD 102 by a non-load-store interface, such as a FC controller that is coupled via an Infiniband link to an Infiniband host channel adapter (HCA) that is coupled to the OSD 102 by a load-store bus. In such a system, the Infiniband HCA's programming interface is mapped into the OSD 102 and an Infiniband HCA device driver performs load-store transactions to control the Infiniband HCA, which in response transmits Infiniband packets to the FC controller to request I/O operations. As may be observed, the Infiniband-based FC controller in the Infiniband system is not mapped into the OSD 102 system load-store memory map. That is, the FC controller is not within the load-store architecture of the OSD 102.

Each FC controller 104 programming interface is mapped into its respective OSD 102 system load-store memory map. By way of illustration, in embodiments in which the load-store bus 106 is a PCI-family bus, the FC controller 104 is mapped into its OSD 102 according to the well-known PCI configuration operation. It should be appreciated from FIG. 1 that the conventional FC controllers 104 are non-shared FC controllers; that is, each FC controller 104 is mapped into only one OSD 102 and is therefore controlled by only one OSD 102.

Figure 2:
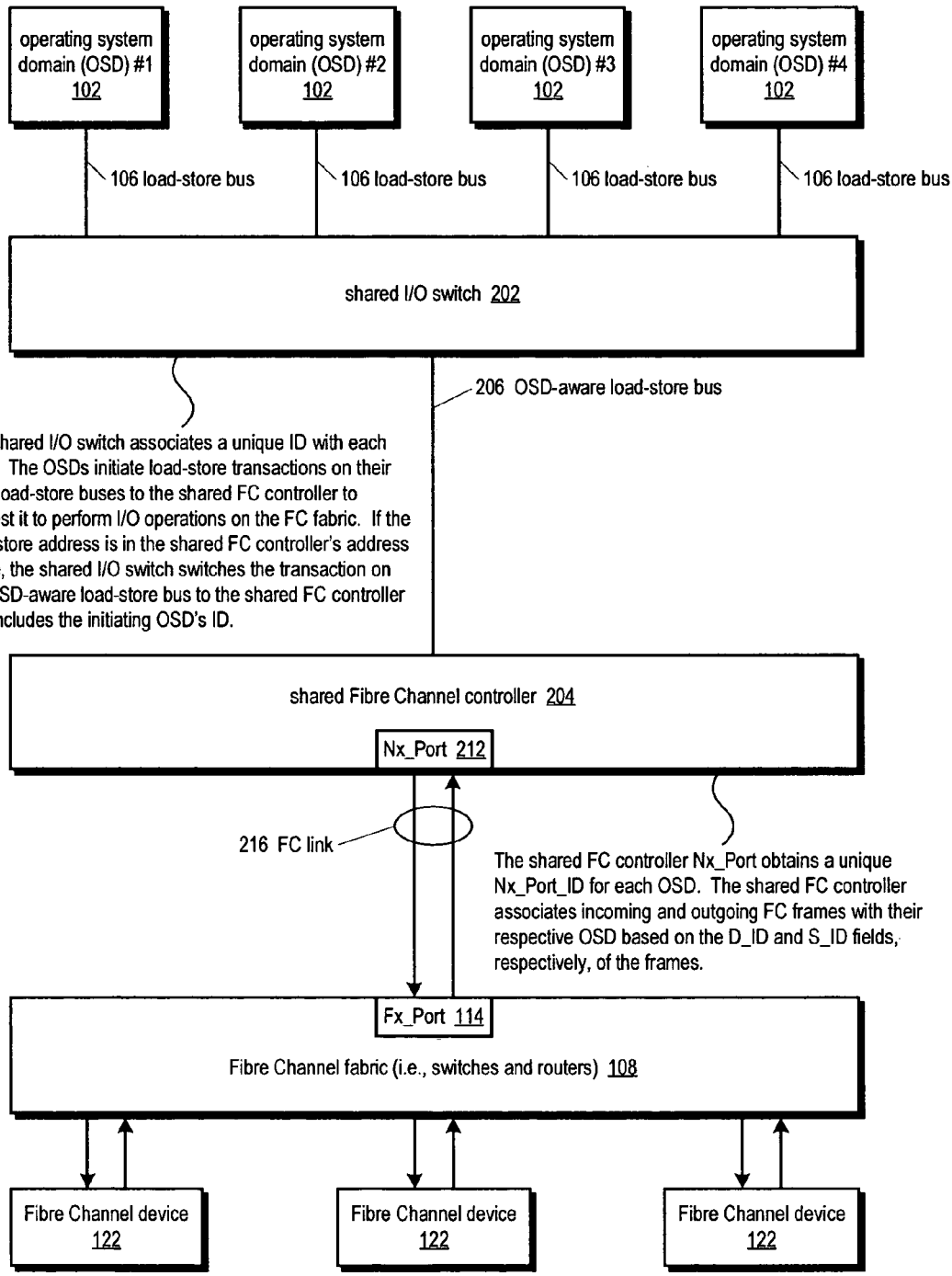
FIG. 2 is a block diagram illustrating a computer system including an I/O switch and a shared FC controller that is shared by a plurality of operating system domains (OSDs) according to the present invention.

Referring now to FIG. 2, a block diagram illustrating a computer system 200 including an I/O switch 202 and a shared FC controller 204 that is shared by a plurality of OSDs 102 according to the present invention is shown. The OSDs 102 and load-store buses 106 of FIG. 2 are similar to like-numbered elements of FIG. 1. For ease of illustration, the OSDs 102 of FIG. 2 are referred to individually as OSD #1, OSD #2, OSD #3, and OSD #4. Similarly, the FC fabric 108 and FC devices 122 of FIG. 2 are similar to like-numbered elements of FIG. 1.

In contrast to FIG. 1, the OSDs 102 are coupled via their respective load-store buses 106 to a shared I/O switch 202, rather than to respective conventional FC controllers 104. The shared I/O switch 202 is coupled to a shared FC controller 204 via an OSD-aware load-store bus 206. The shared FC controller 204 includes a FC Nx_Port 212 coupled to the Fx_Port 114 of the FC fabric 108 via a FC link 216. The OSDs 102 all communicate with the FC devices 122 via the shared FC controller 204 as described herein, thereby advantageously potentially reducing system cost by reducing the number of FC controllers required.

Although operation of the shared I/O switch 202 is described in detail in the parent U.S. Patent Applications referenced above, a brief description of the operation of the shared I/O switch 202 will now be given in an embodiment in which the load-store buses 106 comprise PCI Express buses and the OSD-aware load-store bus 206 comprises a PCI Express+ bus. In this embodiment, the shared FC controller 204 is a PCI Express I/O endpoint modified to be shared by multiple OSDs 102 comprising multiple PCI Express root complexes.

The shared I/O switch 202 comprises multiple upstream PCI Express ports each coupled to a respective OSD 102 via a PCI Express bus 106. The shared I/O switch 202 associates an OSD ID with each OSD 102 and its respective PCI Express port that uniquely identifies each OSD 102 to the shared FC controller 204. The OSD ID may be provided by any of various means, including but not limited to those described with respect to FIGS. 19 through 21 below. In one embodiment, the shared I/O switch 202 assigns OSD IDs in consecutive order beginning with zero. That is, the shared I/O switch 202 assigns ID 0 to the first OSD 102 detected, ID1 to the second OSD 102 detected, and so forth. The OSDs 102 initiate load-store transactions with memory or I/O addresses targeted at the shared FC controller 204 programming interface to request the shared FC controller 204 to perform I/O operations on the FC fabric 108 with the FC devices 122. The shared I/O switch 202 detects that the load-store transaction target address is in one of the one or more address ranges to which the shared FC controller 204 is configured, and switches the transaction on the OSD-aware load-store bus 206 to the shared FC controller 204 along with the initiating OSD's ID. In one embodiment, the OSD ID is included within an OSD header of an enhanced PCI Express packet referred to as a PCI Express+ packet as described below with respect to FIGS. 19 through 21, and in embodiments described in the related patent applications incorporated by reference herein. The shared FC controller 204 uses the OSD ID to distinguish between load-store transactions from the various OSDs 102. Conversely, if the shared FC controller 204 initiates a transaction on the OSD-aware load-store bus 206 targeted at an OSD 102, then the shared FC controller 204 supplies the OSD ID on the OSD-aware load-store bus 206, and the shared I/O switch 202 switches the transaction to the one of the OSDs 102 specified by the OSD ID. In this manner the shared FC controller 204 appears to each OSD 102 as a conventional FC controller 104 of FIG. 1, thereby advantageously requiring little or no modification to the OSD 102 FC controller device driver and/or operating system.

Additionally, the shared FC controller 204 obtains a unique Port_ID for its Nx_Port 212 for each OSD 102. The shared FC controller 204 associates incoming and outgoing FC frames on its FC link 216 with their respective OSD 102 and its OSD ID based on the D_ID and S_ID fields, respectively, of the FC frames, as described in detail below. Advantageously, obtaining a unique FC Port_ID for its Nx_Port 212 for association with a respective OSD 102 enables the shared FC controller 204 to be shared by the multiple OSDs 102. Now one of at least two possible configurations in which the shared FC controller 204 obtains multiple Port_IDs for its Nx_Port 212 will be described.

Referring now to FIG. 3, a block diagram illustrating the shared FC controller 204 of FIG. 2 operating in a virtual arbitrated loop mode to obtain multiple NL_Port_IDs for association with multiple OSDs 102 according to the present invention is shown. FIG. 3 includes a physical view and a logical view of the shared FC controller 204 and its connection to the FC fabric 108 of FIG. 2.

In the physical view, in the embodiment of FIG. 3, the Nx_Port 212 of FIG. 2 is a FC NL_Port 212, and the Fx_Port 114 of FIG. 2 is a FC FL_Port 114. The NL_Port 212 of the shared FC controller 204 and the FL_Port 114 of the FC fabric 108 are both linked to a physical FC arbitrated loop 302. Although only two FC-AL ports are shown in the physical arbitrated loop 302 of FIG. 3, namely the shared FC controller 204 NL_Port 112 and the fabric 108 FL_Port 114, the arbitrated loop 302 may also include NL_Ports of other FC devices, such as storage device nodes or host nodes. The NL_Ports of the various FC devices may be linked to a FC hub for physical cabling ease. In one embodiment, the NL_Port 112 of the shared FC controller 204 may be included in a FC arbitrated loop that is not attached to a FC switched fabric, but instead is coupled to other FC devices, such as storage device nodes or host nodes via the arbitrated loop 302. In this configuration, the arbitrated loop 302 may be referred to herein as the FC fabric 108. In this configuration, the NL_Port 112 is capable of acting as the loop initialization master.

In the logical view, in the embodiment of FIG. 3, the shared FC controller 204 logically comprises a plurality of virtual FC controllers 304. The embodiment of FIG. 3 includes four virtual FC controllers 304. Each of the four of virtual FC controllers 304 logically is controlled by a corresponding one of the four OSDs 102 of FIG. 2. Each of the four of virtual FC controllers 304 logically has its own virtual NL_Port 312 with an NL_Port_ID obtained for each respective OSD 102 that is unique to the FC fabric 108 and arbitrated loop 302, as described below with respect to FIG. 6. Thus, the virtual NL_Ports 312 are included in a virtual arbitrated loop 322. It should be appreciated that to the FC fabric 108 and any other physical FC devices on the arbitrated loop 302, the shared FC controller 204 physical NL_Port 212 appears as a plurality of NL_Ports belonging to a corresponding plurality of FC nodes comprising the corresponding OSDs 102.

Figure 4:
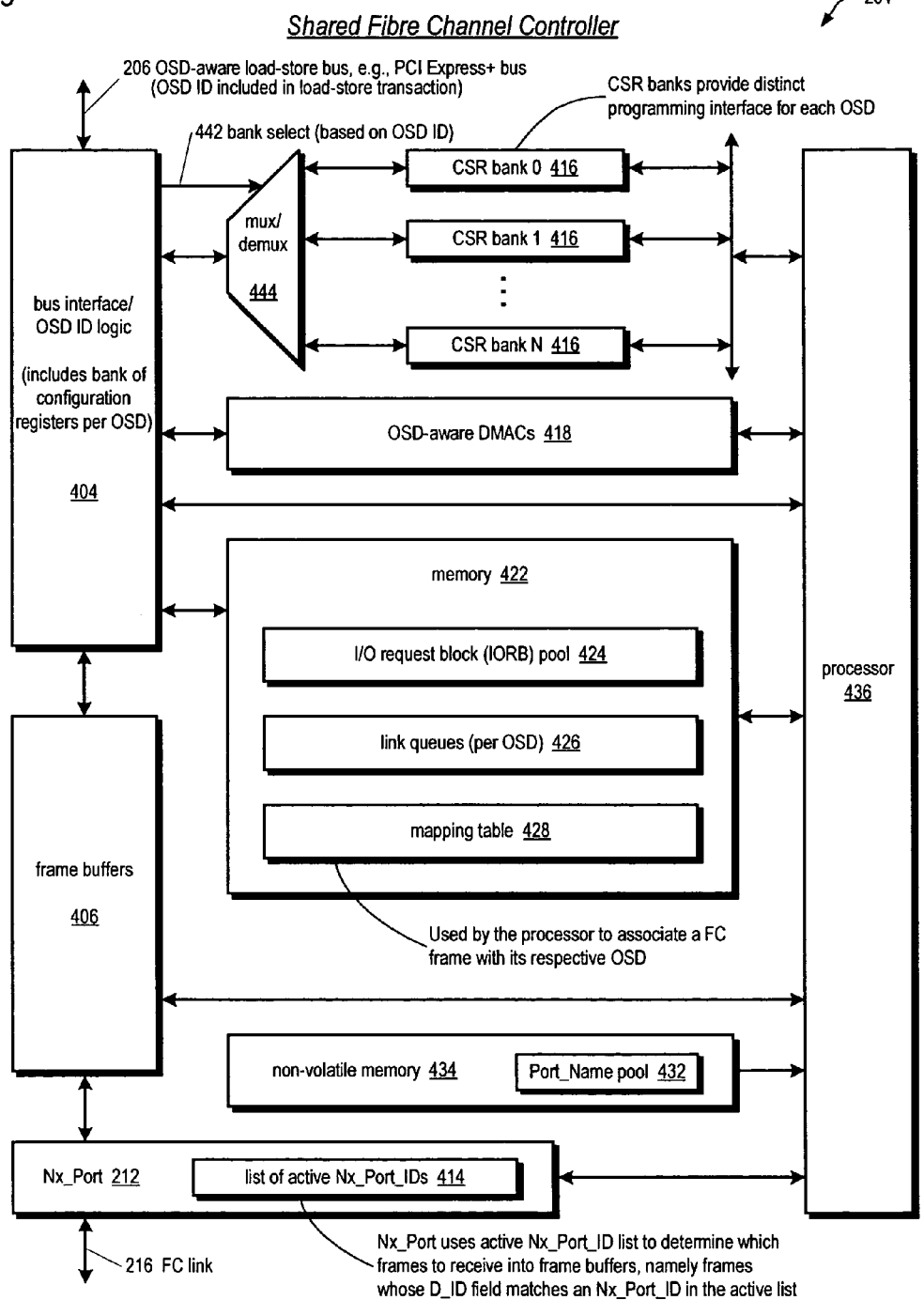
FIG. 4 is a block diagram of the shared FC controller of FIG. 2 according to the present invention.

Referring now to FIG. 4, a block diagram of the shared FC controller 204 of FIG. 2 according to the present invention is shown. The shared FC controller 204 may be a single integrated circuit or may comprise multiple integrated circuits included on one or more printed circuit boards. Furthermore, the shared FC controller 204 may be comprised within the shared I/O switch 202 of FIG. 2 or vice versa, as described below with respect to FIGS. 18 and 16, respectively.

The shared FC controller 204 includes a processor 436. The processor 436 may include, but is not limited to, a general purpose microprocessor core capable of executing stored program instructions, a specialized sequencer core capable of executing stored program instructions, or specialized hardware configured to perform the functions described herein. The processor 436 may comprise a distinct integrated circuit included on a printed circuit board with other elements of the shared FC controller 204, or may be integrated with one or more circuits of the shared FC controller 204.

The shared FC controller 204 includes a non-volatile memory 434, coupled to the processor 436, for storing a pool of FC Port_Names 432. FC Port_Names comprise a 64-bit identifier uniquely identifying each FC Port. As described below, the Port_Names in the Port_Name pool 432 may be used in some embodiments of the shared FC controller 204 to obtain a unique FC Port_ID for each OSD 102.

The shared FC controller 204 also includes frame buffers 406, coupled to the processor 436, for buffering FC frames or portions thereof between the FC devices 122 and the OSDs 102, and more specifically between the FC link 216 and the OSD-aware load-store bus 206.

The shared FC controller 204 also includes the Nx_Port 212 of FIG. 2, coupled to the processor 436 and to the frame buffers 406. Although the shared FC controller 204 illustrated herein illustrates only one Nx_Port 212, the shared FC controller 204 may comprises multiple physical Nx_Ports 212, and the methods of acquiring multiple Nx_Port_IDs described herein may be employed for each of multiple physical Nx_Ports 212. The Nx_Port 212 is coupled to the FC link 216 of FIG. 2. The Nx_Port 212 transmits FC frames on the FC link 216 from the frame buffers 406 as commanded by the processor 436. The Nx_Port 212 maintains a list of active Nx_Port_IDs 414. In one embodiment, the processor 436 populates the list of active Nx_Port_IDs 414. The list of active Nx_Port_IDs 414 is the list of Nx_Port_IDs that the Nx_Port 212 has obtained from the FC fabric 108. In the case in which the Nx_Port 212 is part of a FC arbitrated loop not coupled to a FC fabric, the list of active Nx_Port_IDs 414 is the list of Nx_Port_IDs obtained during arbitrated loop initialization. The Nx_Port 212 receives from the FC link 216 into the frame buffers 406 FC frames that have a D_ID field matching any of the Nx_Port_IDs in the list of active Nx_Port_IDs 414. In the embodiment in which the shared FC controller 204 comprises multiple Nx_Ports 212, the Nx_Port_ID space of the multiple Nx_Ports 212 may overlap; therefore, the shared FC controller 204 includes a separate mapping table 428 for each Nx_Port 212 since the Nx_Ports 212 may be coupled to distinct FC fabrics, and each Nx_Port 212 maintains its own list of active Nx_Port_IDs 414. Additionally, Port_Names from the Port_Name pool 432 are allocated uniquely among the multiple Nx_Ports 212, i.e., no Port_Name is used twice.

The shared FC controller 204 also includes a memory 422, coupled to the processor 436. The memory 422 may be used by the processor 436 for various purposes, such as for storing programs and data. In particular, the memory 422 includes an I/O request block (IORB) pool 424 for storing I/O requests received from the OSDs 102, described in more detail below with respect to FIGS. 10 and 11. The memory 422 also includes link queues 426 for storing link queue entries, also described in more detail below with respect to FIGS. 10 and 11. Briefly, the link queue entries comprise control block data structures associated with operations of the Nx_Port 212 on the FC link 216, such as the transmission or reception of FC frames or management operations. In one embodiment, the shared FC controller 204 includes one link queue 426 per OSD 102. It should be noted that although the link queues 426 are referred to as queues, and in one embodiment denote first-in-first-out data structures, other structures are contemplated, and what is important is that a list or set of control blocks is maintained on a per-OSD 102 basis in order to accommodate the potential overlap in name spaces among the OSDs 102 regarding the association information 1026 described below with respect to FIGS. 10 and 11. The memory 422 also includes a mapping table 428. The mapping table 428 is used by the processor 436 to associate a FC frame with its respective OSD 102. For outgoing frames, the processor 436 looks up in the mapping table 428 the Nx_Port_ID obtained for the OSD 102 associated with the outgoing frame, and populates the S_ID field of the outgoing frame with the Nx_Port_ID, as described below with respect to FIG. 12. For incoming frames, the processor 436 looks up the frame's D_ID in the mapping table 428 to determine which OSD 102 the incoming frame is associated with, as described below with respect to FIG. 13. One embodiment of the mapping table 428 is described in more detail below with respect to FIG. 5. In this embodiment, each virtual Nx_Port 312 (or 712) logically has its own link queue 426 associated with it for storing link queue entries associated with the virtual FC link to which the virtual Nx_Port 312/712 is virtually linked. Although the memory 422 is described as a single memory, other embodiments are contemplated in which the memory 422 comprises multiple memories that may be segregated into separate memory subsystems according to the need of the shared FC controller 204.

The shared FC controller 204 also includes bus interface/OSD ID logic 404, coupled to the frame buffers 406, memory 422, and processor 436. The bus interface/OSD ID logic 404 interfaces the shared FC controller 204 to the OSD-aware load-store bus 206. In particular, the bus interface/OSD ID logic 404 is configured to initiate transactions and be a target of transactions on the OSD-aware load-store bus 206. In an embodiment in which the OSD-aware load-store bus 206 is a PCI Express+ bus, the bus interface/OSD ID logic 404 comprises circuitry for interfacing to a PCI Express+ bus, which is very similar to circuitry for interfacing to a PCI Express bus. The PCI Express+ bus interface circuitry also includes circuitry for determining the OSD ID of the one of the OSDs 102 that transmitted a PCI Express+ packet to the shared FC controller 204 and for populating each PCI Express+ packet transmitted by the PCI Express+ bus interface circuitry to one of the OSDs 102 with its respective OSD ID. That is, the bus interface/OSD ID logic 404 is configured to differentiate between the OSDs 102 communicating with the shared FC controller 204 as sources or destinations of packets.

A conventional PCI Express bus interface includes PCI configuration registers which are used to specify the location of PCI Express devices within the system load-store memory map, or OSD. In particular, once the system assigns the location of a PCI Express device within the system load-store memory map, the PCI Express device then determines whether a packet is destined for itself by decoding the memory or I/O address specified in the packet using the values programmed into its PCI configuration registers. Advantageously, the bus interface/OSD ID logic 404 of the shared FC controller 204 includes a bank of configuration registers for each OSD 102, since the location of the shared FC controller 204 may be different within each system load-store memory map, or OSD 102. Briefly, when the bus interface/OSD ID logic 404 receives a packet from the OSD-aware load-store bus 206, the bus interface/OSD ID logic 404 determines the OSD ID from the packet and uses the OSD ID to select the bank of PCI configuration registers for the respective OSD 102, and then operates using the selected bank of PCI configuration registers similar to a conventional PCI Express device with respect to accepting or dropping the packet. That is, the shared FC controller 204 determines whether a packet received on the OSD-aware load-store bus 206 is destined for itself by decoding the memory or I/O address specified in the packet using the values programmed into the bank of PCI configuration registers selected based on the OSD ID, as described in more detail below with respect to FIG. 15.

In one embodiment, such as embodiments in which the load-store bus 106 and/or OSD-aware load-store bus 206 are PCI family load-store buses, if a reset occurs, the location of the shared FC controller 204 within the system load-store memory map of the OSD 102 does not survive; consequently, the location of the shared FC controller 204 within the system load-store memory map must be reconfigured. This is in contrast, for example, to a shared FC controller that is accessed by the OSDs via some non-load-store architectures. Consider, for example, a system in which multiple OSDs each include an InfiniBand host channel adapter (HCA) controlled by its respective OSD via a load-store architecture, and each of the InfiniBand HCAs is coupled an InfiniBand switch. The system also includes an InfiniBand-to-FC controller that is coupled to the InfiniBand switch and is thus shareable by the OSDs. The InfiniBand-to-FC controller is a device addressed by its ID on the InfiniBand fabric (e.g., an InfiniBand DLID) and, as discussed above, is not within, or addressed via, the load-store architecture of the OSDs. Consequently, if a reset occurs within the load-store architecture of one of the OSDs, the location of the OSD's InfiniBand HCA must be reconfigured; however, the InfiniBand-to-FC controller retains its address on the InfiniBand fabric and need not be reconfigured.

The shared FC controller 204 also includes one or more direct memory access controllers (DMACs) 418, coupled to the processor 436 and to the bus interface/OSD ID logic 404. The DMACs 418 command the bus interface/OSD ID logic 404 to initiate data transfers between the OSDs 102 and the shared FC controller 204. For example, the DMACs 418 may command the bus interface/OSD ID logic 404 to transfer FC frames, or portions thereof such as frame payload data, from the frame buffers 406 to the OSDs 102 memory, and vice versa. For another example, the DMACs 418 may command the bus interface/OSD ID logic 404 to transfer data from the OSDs 102 memory to the shared FC controller 204 memory 422, and vice versa. In one embodiment, the DMACs 418 command the bus interface/OSD ID logic 404 to transfer I/O requests from an OSD 102 memory to the I/O request block pool 424 so that the shared FC controller 204 can process the I/O requests. Conversely, the DMACs 418 command the bus interface/OSD ID logic 404 to transfer I/O request status from the shared FC controller 204 memory 422 to the OSD 102 memory as part of the completion of the I/O request. The DMACs 418 provide to the bus interface/OSD ID logic 404 the OSD ID of the OSD 102 with which the data transfer is to be performed, thereby enabling the bus interface/OSD ID logic 404 to provide the OSD ID in the transaction on the OSD-aware load-store bus 206.

The shared FC controller 204 also includes a programming interface mapped into the system load-store memory map of each of the OSDs 102 for controlling the shared FC controller 204. In particular, the programming interface is used by the OSDs 102 to submit I/O requests to the shared FC controller 204 and is used by the shared FC controller 204 to communicate completions of the I/O requests to the OSDs 102. In one embodiment, the programming interface may advantageously appear to each OSD 102 as a conventional, i.e., non-shared, FC controller, thereby allowing already developed device drivers to control the shared FC controller 204 with little or no modification. In other embodiments, the programming interface may be developed in the future directed toward a shared FC controller. In either case, what is important is that although the programming interface appears in the system load-store memory map of each OSD 102, the shared FC controller 204 provides the necessary hardware resources to enable each OSD 102 to concurrently program the programming interface to issue I/O requests to the shared FC controller 204 and to concurrently receive I/O request completions from the shared FC controller 204, in some embodiments, without deference to, or even knowledge of, the other OSDs 102. Consequently, device drivers developed for non-shared FC controllers may also be employed by the OSDs 102 to control the shared FC controller 204 with little or no modification to the device driver. The shared FC controller 204 is capable of this because, as necessary, the hardware resources of the programming interface are replicated on the shared FC controller 204 for each OSD 102, and for each load-store transaction directed to the programming interface the shared FC controller 204 directs the load-store to the appropriate replicated hardware resource depending upon the OSD 102 that initiated the load or store, as described herein. The OSDs 102 concurrently program the shared FC controller 204 programming interface by concurrently initiating transactions on their load-store buses 106. For example, in an embodiment in which the load-store buses 106 are PCI Express buses, the OSDs 102 may concurrently, and perhaps simultaneously, transmit Memory Write/Read command PCI Express packets to the shared I/O switch 202 targeted at the shared FC controller 204, and the shared I/O switch 202 will route the packets to the shared FC controller 204 on the OSD-aware load-store bus 206 in a time-multiplexed fashion. For another example, in an embodiment in which the load-store buses 106 are PCI-X buses, the OSDs 102 may simultaneously arbitrate for and initiate Memory Write/Read commands to the shared I/O switch 202 targeted at the shared FC controller 204, and the shared I/O switch 202 will route the commands to the shared FC controller 204 on the OSD-aware load-store bus 206. Thus, the shared FC controller 204 may receive a first group of one or more load-store transactions from a first group of one or more of the OSDs 102 prior to completion of a second group of one or more load-store transactions from a second group of one or more of the OSDs 102, such that multiple load-store transactions are outstanding within the shared FC controller 204 at any given time. Consequently, the shared FC controller 204 may receive a first group of one or more I/O requests from a first group of one or more of the OSDs 102 prior to completion of a second group of one or more I/O requests from a second group of one or more of the OSDs 102, such that multiple I/O requests are outstanding within the shared FC controller 204 at any given time. Conversely, the shared FC controller 204 may initiate transactions on the OSD-aware load-store bus 206 targeted at the various OSDs 102 in an interleaved fashion. The shared I/O switch 202 receives the transactions and may concurrently, and perhaps simultaneously, transmit the transactions to the targeted OSDs 102 on their respective load-store buses 106. In this manner the OSDs 102 concurrently receive I/O request completions or requested data (such as user data from storage devices) from the shared FC controller 204, without having to arbitrate with one another for access to the programming interface, and without having to know of the existence of one another.

The programming interface includes a bank of control/status registers (CSRs) 416, coupled to the processor 436 and to the bus interface/OSD ID logic 404, for each OSD 102. The shared FC controller 204 includes multiplexing/demultiplexing circuitry 444 coupled between the bus interface/OSD ID logic 404 and the CSRs banks 416. The bus interface/OSD ID logic 404 generates a bank select signal 442 provided to the multiplexing/demultiplexing circuitry 444 to select one of the CSR banks 416 based on the OSD ID of the OSD 102 performing the load-store transaction from/to the programming interface. In one embodiment, the OSD ID may be used directly to select the appropriate CSR bank 416; however, in other embodiments, the bus interface/OSD ID logic 404 must translate or decode the OSD ID to generate the bank select signal 442. Furthermore, the bank select signal 442 and multiplexing/demultiplexing circuitry 444 described herein may be viewed as an illustration of the general notion of selecting one of multiple CSR banks 416 based on the OSD 102 that executed the load-store instruction addressed to the shared FC controller 204 programming interface.

The OSDs 102 execute load-store instructions whose source-destination addresses specify a particular register in the programming interface CSRs 416 to program the shared FC controller 204, such as to initialize the shared FC controller 204 or to request the shared FC controller 204 to perform I/O requests with other FC devices, such as FC devices 122. For example, the programming interface CSR bank 416 may include a doorbell register to which an OSD 102 stores a value to command the shared FC controller 204 to process an I/O request. The value stored in the doorbell register may specify an address in the OSD 102 memory of the I/O request, and the processor 436 may read the doorbell register to obtain the I/O request address for programming a DMAC 418 to fetch the I/O request from the OSD 102 memory. Although the OSD 102 is not aware that the shared FC controller 204 actually includes multiple banks of CSRs 416, the shared FC controller 204 transparently directs the doorbell store transaction to the doorbell register of the particular CSR bank 416 assigned to the OSD 102 that executed the store instruction. For another example, the programming interface CSR bank 416 may include an interrupt status register from which the OSD 102 performs a load to determine the status of and/or clear an interrupt generated by the shared FC controller 204 to the OSD 102. Similarly, the shared FC controller 204 transparently directs the load transaction to the interrupt status register of the particular CSR bank 416 assigned to the OSD 102 that executed the load instruction and returns the data value read from the correct interrupt status register. Thus, the shared FC controller 204 provides a single programming interface to each OSD 102, i.e., the shared FC controller 204 includes a plurality of programming interfaces—one for each OSD 102. Thus, to each OSD 102, the shared FC controller 204 appears as a dedicated virtual FC controller 304 of FIG. 3 (or FIG. 7) having its own virtual NL_Port 312 of FIG. 3 (or N_Port 712 of FIG. 7) for accessing other FC devices, such as FC devices 122 on the FC fabric 108 and/or arbitrated loop 302. Without the benefit of an actual programming interface for each OSD 102, the OSDs 102 would be required to coordinate with one another for access to a single programming interface in order to submit I/O requests to the shared FC controller 204 and receive completions from it, which would result in reduced system performance.

The programming interface may also include a memory (not shown) on the shared FC controller 204 accessible to the OSDs 102 into which the OSDs 102 store I/O requests, as described in more detail below. Each CSR bank 416 may include a register that the OSD 102 and shared FC controller 204 employ to communicate the location of the I/O requests in the programming interface memory.

When the shared FC controller 204 is the target of a load transaction on the OSD-aware load-store bus 206, the bus interface/OSD ID logic 404 provides in its response the requested data; additionally, the bus interface/OSD ID logic 404 provides the OSD ID specified in the load request along with the data. The OSD ID in the response enables the shared I/O switch 202 to route the load data to the appropriate OSD 102. When the shared FC controller 204 is the target of a store transaction on the OSD-aware load-store bus 206, the bus interface/OSD ID logic 404 examines the OSD ID specified in the store request and directs the store data to the appropriate bank of CSRs 416 selected by the OSD ID. If the store address is to a location other than CSRs 416, such as a memory of the shared FC controller 204 for receiving I/O requests described briefly above, the bus interface/OSD ID logic 404 examines the OSD ID specified in the store request and directs the store data to the appropriate bank or region of the memory selected by the OSD ID.

The CSRs 416 comprise storage elements for storing the values written and read by the OSDs 102 and/or the processor 436. In one embodiment, the CSRs 416 comprise registers, latches, flip-flops, or the like. In one embodiment, the CSRs 416 comprise memory, such as RAM, DRAM, SDRAM, DDRAM, or the like, that is mapped to the CSR 416 address space. In an embodiment in which a large number of CSR banks 416 are instantiated to support a large number of OSDs 102, the CSR banks 416 may be implemented in a separate integrated circuit from the shared FC controller 204. In one embodiment, not all registers of the CSR banks 416 are instantiated on a per-OSD basis. That is, although each OSD 102 perceives that it has its own dedicated bank of CSRs 416, some of the registers that do not need to be replicated may be physically implemented on a shared basis rather than a replicated basis. For example, the programming interface CSRs 416 may include a read-only register that stores information that is global to the shared FC controller 204, i.e., information that is the same for all virtual instances of the shared FC controller 204 regardless of the OSD 102 reading the register. In this case, the register may be only instantiated once physically; and when an OSD 102 performs a load from the register, the multiplexing/demultiplexing circuitry 444 directs the load to the single physically instantiated register for all OSDs 102. For another example, in one embodiment, the OSD 102 operating system also includes a global management agent that globally manages the shared FC controller 204 for all the OSDs 102 and the CSRs 416 include certain registers that are writeable only by the global management agent but readable by all the OSDs 102. These registers may be instantiated as a single physical register.

The bus interface/OSD ID logic 404 is also configured to generate an interrupt to an OSD 102 to indicate event completions, such as the completion of an I/O request or the reception of an I/O request received in an incoming frame from another FC device, such as another FC host. In one embodiment, the processor 436 writes to the bus interface/OSD ID logic 404 to cause the bus interface/OSD ID logic 404 to generate the interrupt to the OSD 102. When the processor 436 performs the write to the bus interface/OSD ID logic 404, the processor 436 also writes the OSD ID) associated with the OSD 102 to be interrupted. In another embodiment, the processor 436 generates an interrupt to a specific OSD 102 by writing to a particular CSR 416 in the CSR bank 416 associated with the OSD 102 to be interrupted, and the bus interface/OSD ID logic 404 knows the OSD ID associated with each CSR bank 416. In either embodiment, the bus interface/OSD ID logic 404 uses the OSD ID to generate the interrupt to the specified OSD 102. The interrupt request may be, but is not limited to, a PCI-style message signaled interrupt (MSI) modified to include the OSD ID. The MSI may comprise a PCI Express MSI packet modified to include the OSD ID, i.e., a PCI Express+ MSI packet.

The ability of the shared FC controller 204 to interrupt the OSDs 102 to indicate event completions, such as I/O request completions, is possible due to the fact that the shared FC controller 204 is within the load-store architecture of the OSDs 102. Again, this is in contrast to a system including an InfiniBand-to-FC controller shared by multiple OSDs as described above. In such a system, the shared InfiniBand-to-FC controller is unable to directly interrupt an OSD. At best, the shared InfiniBand-to-FC controller can transmit an InfiniBand packet to one of the InfiniBand HCAs to indicate an event, such as an I/O request completion, and it is up to the InfiniBand HCA to interrupt the OSD if appropriate. Furthermore, the HCA may or may not interrupt the OSD, depending upon the nature of the I/O request completion in relation to the original request from the OSD to the HCA, such as whether or not the original request was an upper level protocol request of which the completion from the InfiniBand-to-FC controller to the HCA was only a part. In either case, the shared InfiniBand-to-FC controller is unable to directly interrupt an OSD.

As with conventional FC controllers, a load or store transaction by an OSD 102 to one or more predetermined ones of the CSRs 416, such as a doorbell register, may generate an interrupt to the processor 436. However, the processor 436 must be able to determine which of the OSDs 102 performed the interrupting load or store transaction. In one embodiment, the shared bus interface/OSD ID logic 404 comprises a register that includes a bit associated with each OSD 102. When an OSD 102 performs an interrupting load or store transaction, the bus interface/OSD ID logic 404 sets the OSD's 102 bit in the register. The processor's 436 interrupt service routine examines the register to quickly determine which OSDs 102 have performed an interrupting load-store transaction. In one embodiment, the read of the register clears the register.

It should be appreciated that in various embodiments, from the OSDs' 102 perspective, the programming interface presented to each OSD 102 is similar to, if not identical to, the programming interface provided by a non-shared FC controller, such as the FC controllers 104 of FIG. 1, to the OSD 102, thereby advantageously enabling the OSD 102 operating system and device drivers to control the shared FC controller 204 with little or no modification. Because the shared FC controller 204 advantageously provides the appearance to each of the OSDs 102 that the OSD 102 has its own dedicated programming interface, the OSD 102 device drivers may typically operate as if they are controlling a non-shared FC controller. Thus, advantageously, the shared FC controller 204 may enable the system 200 to avoid or minimize the cost of retrofitting OSD 102 device driver software while still obtaining the cost advantages of a computing environment with a FC controller that is shared among multiple OSDs 102 over a computing environment in which each OSD 102 has its own FC controller.

As discussed above, the OSDs 102 request the shared FC controller 204 to perform I/O operations on the FC fabric 108 by executing load-store instructions whose load-store addresses target the shared FC controller 204. The means by which the OSDs 102 request the shared FC controller 204 to perform I/O operations may include, but are not limited to, means employed by conventional FC controllers, such as the following.

In one embodiment, an OSD 102 builds I/O requests in its memory and executes a store instruction to a programming interface CSR 416, such as a doorbell register, to command the shared FC controller 204 to fetch the I/O request from the OSD's 102 memory and process the I/O request. In this embodiment, the OSD 102 writes into the doorbell register the memory address of the I/O request in the OSD 102 memory; or, the ringing of the doorbell register by the OSD 102 simply instructs the shared FC controller 204 to scan a previously negotiated region in the OSD 102 memory for ready I/O requests.

In another embodiment, the OSD 102 executes store instructions to store the I/O requests themselves directly into multiple registers of the programming interface CSRs 416 of the shared FC controller 204. The OSD 102 performs a store to a special register in the programming interface, such as a doorbell register, as the last store, to inform the shared FC controller 204 that the I/O request has been stored into the registers.

In another embodiment, the OSD 102 executes store instructions to store the I/O requests directly to a memory, as discussed briefly above, that is part of the programming interface of the shared FC controller 204 and that is mapped into the OSDs 102 system load-store memory map similar to the manner in which the CSRs 416 are mapped into the system load-store memory map of each OSD 102. The OSD 102 then rings a doorbell register of the shared FC controller 204 to notify the shared FC controller 204 of the ready I/O request.

The shared FC controller 204 may also employ other means not yet developed for receiving I/O requests from the OSDs 102; however, what is important is the interface to the shared FC controller 204 appears within the load-store domain of the OSD 102, particularly the device driver and operating system, similar to a non-shared FC controller, thereby requiring little or no changes to the device driver and operating system.

Figures 5, 6:
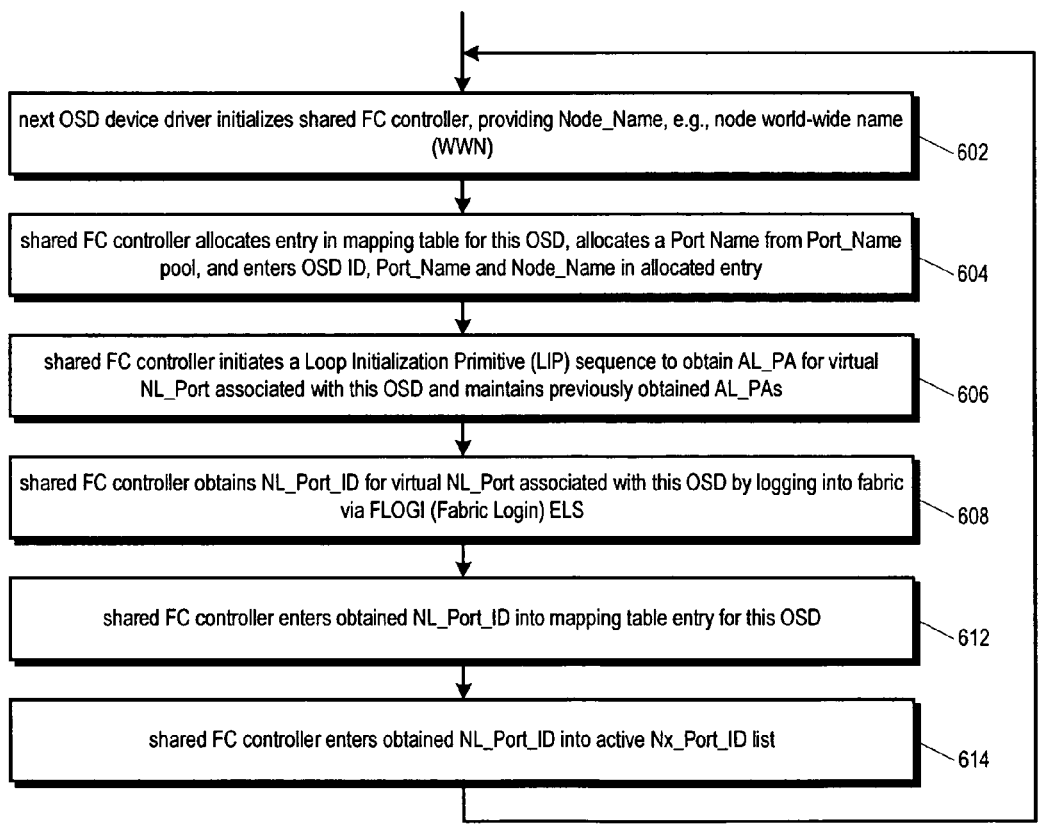
FIG. 5 is a block diagram illustrating one embodiment of the mapping table of FIG. 4.
FIG. 6 is a flowchart illustrating operation of the shared FC controller of FIG. 2 to obtain multiple NL_Port_IDs according to the present invention.

Referring now to FIG. 5, a block diagram illustrating one embodiment of the mapping table 428 of FIG. 4 is shown. The mapping table includes an entry for each of the OSDs 102 communicating with the shared FC controller 204 of FIG. 2. In the embodiment of FIG. 5, each entry in the mapping table 428 includes an OSD ID field 512, an Nx_Port_ID field 514, a Node_Name field 516, a Port_Name field 518, and a linkQ pointer field 522. The OSD ID field 512 specifies the OSD ID of the OSD 102 associated with the entry. The Nx_Port_ID field 514 specifies the Nx_Port_ID obtained for the associated OSD 102, either from the FC fabric 108 of FIG. 2 or from the arbitrated loop 302 of FIG. 3. Thus, advantageously the mapping table 428 may be used by the processor 436 to associate OSD IDs and Nx_Port_IDs.

In order to obtain a FC Port_ID from a FC fabric, the FC Nx_Port must supply a 64-bit FC Node_Name uniquely identifying the FC end node controlling the Nx_Port. The Node_Name field 516 of the mapping table 428 specifies the FC unique Node_Name associated with the OSD 102 of the entry. The Node_Names 516 may comprise any of the formats specified by the FC protocol, such as a unique world-wide name (WWN). In one embodiment, each OSD 102 provides its unique FC Node_Name used to obtain the Nx_Port_ID for itself; however, in another embodiment, the shared FC controller 204 provides a unique Node_Name 516 for each OSD 102 from a pool of Node_Names stored in its non-volatile memory 434 of FIG. 4 similar to the Port_Name pool 432.

In order to obtain a FC Port_ID from a FC fabric, the FC Nx_Port must also supply a 64-bit FC Port_Name uniquely identifying the Nx_Port. The Port_Name field 518 of the mapping table 428 specifies the FC unique Port_Name associated with the virtual NL_Port 312 of FIG. 3 or the virtual N_Port 712 of FIG. 7 of the virtual FC controller 304 associated with the OSD 102 of the entry. The Port_Names 518 may comprise any of the formats specified by the FC protocol, such as a unique world-wide name (WWN). In one embodiment, the shared FC controller 204 provides a unique Port_Name 518 for each virtual Nx_Port 312/712 from the Port_Name pool 432 used to obtain the Nx_Port_ID for each OSD 102; however, in another embodiment, each OSD 102 provides its unique FC Port_Name. Although the Port_Name uniquely identifies the Nx_Port on a world-wide basis, Port_Names are not included in the header field of a normal FC protocol frame and are not used to specify source and destination ports of frames because they are large, i.e., 64 bits. Instead, the smaller 24-bit Nx_Port_ID obtained from the FC fabric 108 (or 8-bit AL_PA in the case of an arbitrated loop) is included in a FC frame header and is used to specify source and destination ports of FC frames. Hence, the shared FC controller 204 obtains from the FC fabric 108 (and/or arbitrated loop) a unique Nx_Port_ID for each of the OSDs 102, as described herein.

The linkQ pointer field 522 of the mapping table 428 specifies an address in the shared FC controller 204 memory 422 of the link queue 426 associated with the OSD 102 specified in the OSD ID field 512 of the mapping table 428 entry. In particular, the processor 436 uses the linkQ pointer field 522 to locate the link queue 426 of the OSD 102 associated with an incoming FC frame received by the Nx_Port 212 into the frame buffers 406, as described in more detail below with respect to FIG. 11. Although FIG. 5 illustrates one embodiment of mapping table 428, it should be understood that other data structures may be employed for associating the Nx_Port_IDs 514 with their respective OSDs 102.

Referring now to FIG. 6, a flowchart illustrating operation of the shared FC controller 204 of FIG. 2 to obtain multiple NL_Port_IDs according to the present invention is shown. The flowchart of FIG. 6 illustrates operation of the shared FC controller 204 configured in a virtual arbitrated loop mode as shown in FIG. 3. Flow begins at block 602.

At block 602, an OSD 102 device driver for controlling a virtual FC controller 304 of FIG. 3 of the shared FC controller 204 initializes the shared FC controller 204 by performing load-store transactions to the shared FC controller 204 programming interface, which are directed to the CSR bank 416 of FIG. 4 associated with the OSD 102, as described above. In one instance, the OSD 102 may perform the initialization when the operating system runs the initialization code (such as a Unix-like init routine) of the FC device driver for the shared FC controller 204. In another instance, the OSD 102 may perform the initialization when the operating system detects that a shared FC controller 204 has been hot-plugged into the system 200. In another instance, the OSD 102 may perform the initialization when the operating system loads, or reloads, a device driver at the request of an upper layer protocol. The initialization may include a variety of functions such as are well-known to be performed by conventional device drivers initializing conventional FC controllers. In particular, the OSD 102 device driver requests the shared FC controller 204 to perform various FC-related initialization functions associated with the NL_Port 212 and FC fabric 108, such as to obtain an NL_Port_ID for the virtual NL_Port 312. In one embodiment, the OSD 102 device driver provides a unique Node_Name 516 used in the FC initialization process to obtain an NL_Port_ID for the virtual NL_Port 312. In another embodiment, the shared FC controller 204 provides the unique Node_Name 516. Flow proceeds to block 604.

At block 604, the shared FC controller 204 allocates an entry in the mapping table 428 for the OSD 102 performing the initialization, namely the OSD 102 requesting the shared FC controller 204 to obtain an NL_Port_ID. The shared FC controller 204 also allocates a unique Port_Name for the OSD 102 from the Port_Name pool 432 of FIG. 4. In one embodiment, the OSD 102 device driver provides the Port_Name 518 in addition to the Node_Name 516, rather than the shared FC controller 204 providing the Port_Name 518. The shared FC controller 204 then enters the OSD ID, Port_Name, and Node_Name into the allocated entry in the mapping table 428. Flow proceeds to block 606.

At block 606, the shared FC controller 204 initiates a FC loop initialization primitive (LIP) sequence on the arbitrated loop 302 to obtain a unique FC AL_PA (arbitrated loop physical address) for the virtual NL_Port 312 associated with this OSD 102. The AL_PA comprises the lower 8 bits of the NL_Port_ID. If the shared FC controller 204 has already obtained an AL_PA for other OSDs 102 that have initialized the shared FC controller 204, then during the LIP sequence, the shared FC controller 204 retains the previously obtained AL_PAs for the other OSDs 102. Thus, for example, the shared FC controller 204 may set multiple bits in the AL_PA bit map in the LIFA and/or LIPA frames during AL_PA assignment in order to retain previously obtained AL_PAs. Thus, although the physical NL_Port 212 is a single physical port, it operates and appears as multiple virtual NL_Ports 312. As stated above, the arbitrated loop 302 may include other FC device NL_Ports that are involved in the LIP sequence. Furthermore, the NL_Port 212 is capable of acting as the loop initialization master. Flow proceeds to block 608.

At block 608, the shared FC controller 204 performs a fabric login process (FLOGI) extended link service (ELS) to obtain from the FC fabric 108 an NL_Port_ID for the virtual NL_Port 312 associated with the OSD 102. The shared FC controller 204 provides the AL_PA obtained at block 606 when performing the FLOGI. Typically, the shared FC controller 204 returns the obtained NL_Port_ID to the OSD 102 as part of the completion of the OSD's 102 request to obtain the NL_Port_ID. In an embodiment in which the NL_Port 212 is not linked to a FC fabric 108, the step at block 608 is not performed, and the NL_Port_ID is simply the AL_PA obtained at block 606. Flow proceeds to block 612.

At block 612, the shared FC controller 204 enters the NL_Port_ID obtained at block 608 into the mapping table 428 entry for the OSD 102. Flow proceeds to block 614.

At block 614, the shared FC controller 204 enters the NL_Port_ID obtained for the OSD 102 into the list of active Nx_Port_IDs 414 of FIG. 4. Flow returns to block 602 to perform the initialization process of FIG. 6 for the next OSD 102.

In one embodiment, the shared FC controller 204 also registers the OSD's 102 Node_Name 516 with the FC fabric's 108 name server using FC common transport services to enable other FC nodes attached to the FC fabric 108 to become aware of the presence of the OSD's 102 virtual NL_Port 312 (or N_Port 712 in the multiple N_Port_ID assignment mode of FIG. 7) as instructed by the OSD 102.

It is noted that the arbitrated loop mode has the potential disadvantage that only 126 OSDs may be supported since FC arbitrated loop limits the number of NL_Ports on a loop to 126. Hence, in one embodiment, the shared FC controller 204 may initially present virtual NL_Ports 312 to the fabric, but if the number of OSDs 102 exceeds the maximum number of NL_Ports obtainable in the FC arbitrated loop, the shared FC controller 204 subsequently may present virtual N_Ports 712 to the FC fabric 108 as described with respect to FIGS. 7 and 8 below.

Advantageously, the shared FC controller 204 enables each OSD's 102 device driver to initiate the process of obtaining an Nx_Port_ID associated with the OSD 102. This has the advantage that the device drivers do not need to be modified to operate with the shared FC controller 204. Furthermore, the shared FC controller 204 need not be configured by an external management agent outside the OSDs 102. It is noted that the level at which a particular device driver requests the virtual FC controller 304 to obtain an Nx_Port_ID may vary from device driver to device driver. For example, some device drivers may simply command the virtual FC controller 304 to obtain the Nx_Port_ID and the virtual FC controller 304 performs all the steps necessary to fulfill the request; whereas other device drivers may be more involved in the process. For example, some device drivers may send a distinct command to perform each step of the process, such as a separate command to perform the LIP sequence and a separate command to perform the FLOGI.

Referring now to FIG. 7, a block diagram illustrating the shared FC controller 204 of FIG. 2 employing the multiple N_Port_ID assignment mode to obtain multiple N_Port_IDs for association with multiple OSDs 102 according to the present invention is shown. The multiple N_Port_ID assignment capability, which is also commonly referred to as N_Port virtualization, is included in the ANSI INCITS 373-2003 FC-FS specification, which may be obtained at http://www.incits.org, and is hereby incorporated by reference for all purposes. Similar to FIG. 3, FIG. 7 includes a physical view and a logical view of the shared FC controller 204 and its connection to the FC fabric 108 of FIG. 2.

In the physical view, in the embodiment of FIG. 7, the Nx_Port 212 of FIG. 2 is a FC N_Port 212, and the Fx_Port 114 of FIG. 2 is a FC F_Port 114. The N_Port 212 of the shared FC controller 204 and the F_Port 114 of the FC fabric 108 are linked to one another via a physical FC link 702 corresponding to FC link 216 of FIG. 2.

In the logical view, in the embodiment of FIG. 7, the shared FC controller 204 logically comprises a plurality of virtual FC controllers 304 similar to those of FIG. 3. Each of the virtual FC controllers 304 logically has its own virtual N_Port 712 with an N_Port_ID obtained for each respective OSD 102 that is unique to the FC fabric 108, as described below with respect to FIG. 8. It should be appreciated that to the FC fabric 108, the shared FC controller 204 physical N_Port 212 appears as a plurality of virtual N_Ports belonging to a corresponding plurality of FC nodes comprising the corresponding OSDs 102.

Figure 8:
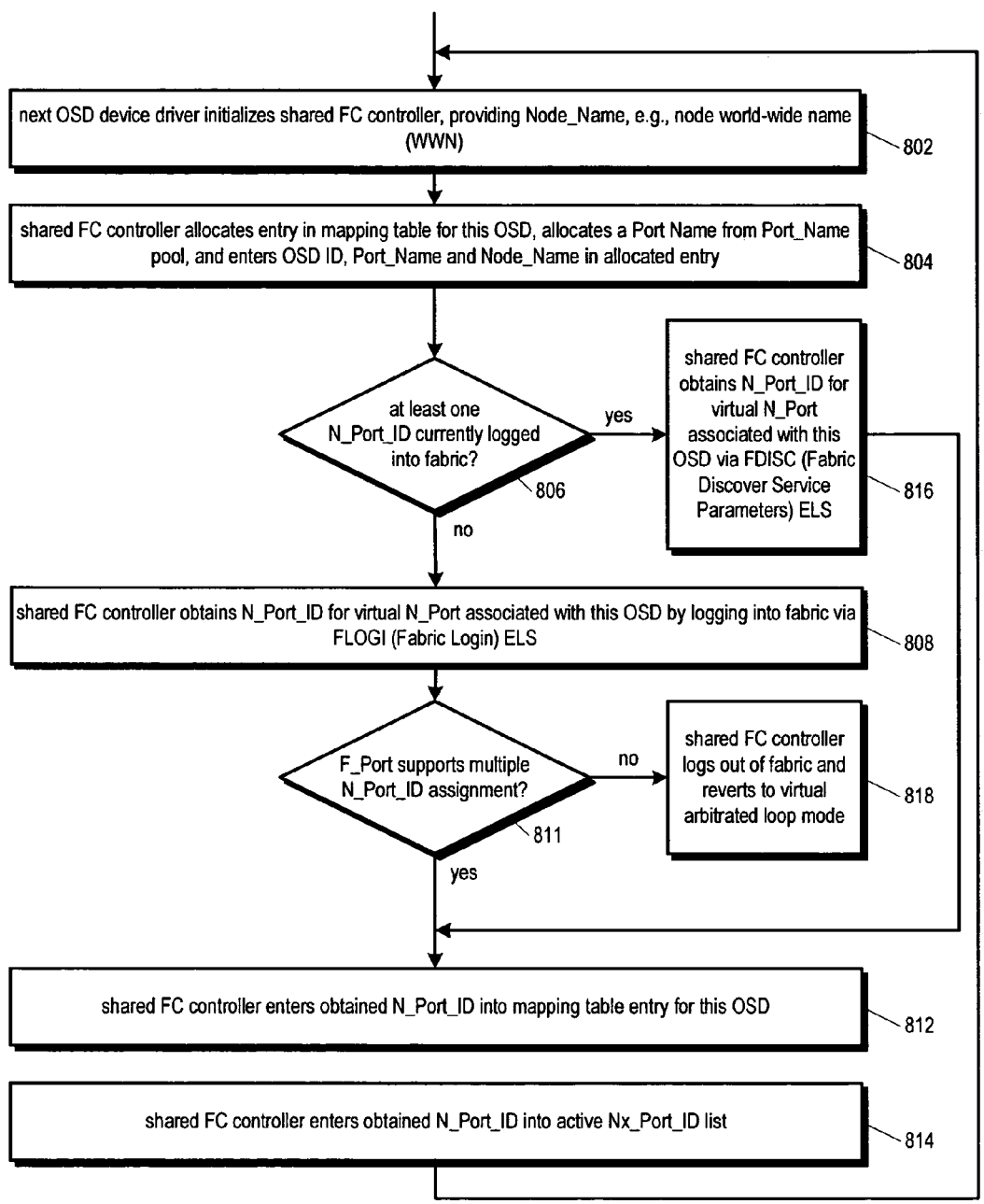
FIG. 8 is a flowchart illustrating operation of the shared FC controller of FIG. 2 in multiple N_Port_ID assignment mode to obtain multiple N_Port_IDs for association with multiple OSDs according to the present invention.

Referring now to FIG. 8, a flowchart illustrating operation of the shared FC controller 204 of FIG. 2 in multiple N_Port_ID assignment mode to obtain multiple N_Port_IDs for association with multiple OSDs according to the present invention is shown. The flowchart of FIG. 8 illustrates operation of the shared FC controller 204 configured in a multiple N_Port_ID assignment mode as shown in FIG. 7. FIG. 8 is similar to FIG. 6 in some aspects; in particular, blocks 802, 804, 808, 812, and 814 are essentially the same as blocks 602, 604, 608, 612, and 614, respectively, of FIG. 6. Flow begins at block 802.

At block 802, an OSD 102 device driver for controlling a virtual FC controller 304 of FIG. 7 of the shared FC controller 204 initializes the shared FC controller 204 by performing load-store transactions to the shared FC controller 204 programming interface, which are directed to the CSR bank 416 of FIG. 4 associated with the OSD 102, as described above. In particular, the OSD 102 device driver requests the shared FC controller 204 to obtain an N_Port_ID for the virtual N_Port 712. Flow proceeds to block 804.

At block 804, the shared FC controller 204 allocates an entry in the mapping table 428 for the OSD 102 performing the initialization, namely the OSD 102 requesting the shared FC controller 204 to obtain an N_Port_ID. The shared FC controller 204 also allocates a unique Port_Name for the OSD 102 from the Port_Name pool 432 of FIG. 4. In one embodiment, the OSD 102 device driver provides the Port_Name 518 in addition to the Node_Name 516, rather than the shared FC controller 204 providing the Port_Name 518. The shared FC controller 204 then enters the OSD ID, Port_Name, and Node_Name into the allocated entry in the mapping table 428. Flow proceeds to decision block 806.

At decision block 806, the shared FC controller 204 determines whether it has at least one Nx_Port_ID already logged into the FC fabric 108, typically from a previous initialization by another OSD 102. If so, flow proceeds to block 816; otherwise, flow proceeds to block 808.

At block 808, the shared FC controller 204 performs a FLOGI ELS to obtain from the FC fabric 108 an N_Port_ID for the virtual N_Port 712 associated with the OSD 102. Typically, the shared FC controller 204 returns the obtained N_Port_ID to the OSD 102 as part of the completion of the OSD's 102 request to obtain the N_Port_ID. Flow proceeds to decision block 811.

At decision block 811, the shared FC controller 204 examines the Multiple N_Port_ID Assignment bit in the service parameters in the LS_ACC packet returned by the F_Port 114 of the FC fabric 108 to determine whether the F_Port 114 supports the Multiple N_Port_ID Assignment feature. If not, flow proceeds to block 818; otherwise, flow proceeds to block 812.

At block 812, the shared FC controller 204 enters the N_Port_ID obtained at block 808 into the mapping table 428 entry for the OSD 102. Flow proceeds to block 814.

At block 814, the shared FC controller 204 enters the N_Port_ID obtained for the OSD 102 into the list of active Nx_Port_IDs 414 of FIG. 4. Flow returns to block 802 to perform the initialization process of FIG. 8 for the next OSD 102.

At block 816, the shared FC controller 204 performs a Fabric Discover Service Parameters (FDISC) ELS to obtain from the FC fabric 108 an N_Port_ID for the virtual N_Port 712 associated with the OSD 102. Typically, the shared FC controller 204 returns the obtained N_Port_ID to the OSD 102 as part of the completion of the OSD's 102 request to obtain the N_Port_ID. Flow proceeds to block 812.

At block 818, the shared FC controller 204 logs out of the FC fabric 108 via a Logout (LOGO) ELS and reverts to virtual arbitrated loop mode, as described with respect to FIGS. 3 and 6 above, because the F_Port 114 does not support the Multiple N_Port_ID Assignment feature. Flow ends at block 818.

Figure 9:
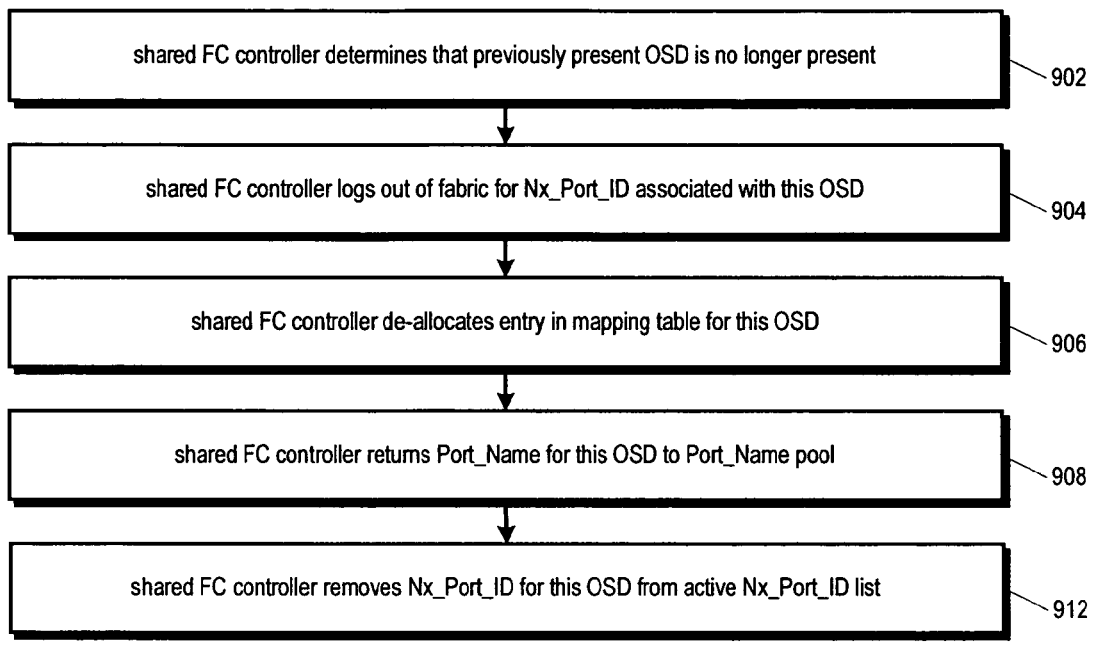
FIG. 9 is a flowchart illustrating operation of the shared FC controller of FIG. 2 in response to removal of an OSD according to the present invention.

Referring now to FIG. 9, a flowchart illustrating operation of the shared FC controller 204 of FIG. 2 in response to removal of an OSD 102 according to the present invention is shown. Flow begins at block 902.

At block 902, the shared FC controller 204 determines that a previously present OSD 102 is no longer present. The shared FC controller 204 may determine that a previously present OSD 102 is no longer present in a variety of manners, including but not limited to, the following. The shared FC controller 204 may receive a reset from the OSD 102. The shared FC controller 204 may have initiated a transaction to the OSD 102 which demands a response and the response timed out. The OSD 102 may have proactively disabled or unloaded itself, which may be accomplished by performing a store transaction to set or clear one or more bits in a register of the CSR bank 416 associated with the OSD 102. Flow proceeds to block 904.

At block 904, the shared FC controller 204 logs out of the FC fabric 108 via a LOGO ELS for the Nx_Port_ID associated with this OSD 102. Flow proceeds to block 906.

At block 906, the shared FC controller 204 de-allocates the entry in the mapping table 428 of FIG. 4 associated with this OSD 102. Flow proceeds to block 908.

At block 908, the shared FC controller 204 returns the Port_Name previously allocated to this OSD 102 to the Port_Name pool 432 of FIG. 4. In embodiments in which the shared FC controller 204 also provided the Node_Name, the shared FC controller 204 also returns the Node_Name to the Node_Name pool. Flow proceeds to block 912.

At block 912, the shared FC controller 204 removes the Nx_Port_ID previously obtained for this OSD 102 from the list of active Nx_Port_IDs 414. Flow ends at block 912.

The operation described in FIG. 9 is chiefly applicable when the shared FC controller 204 is operating in the multiple N_Port_ID assignment mode such as described with respect to FIGS. 7 and 8. In a configuration such as FIG. 3, in which the shared FC controller 204 NL_Port 112 is part of a FC arbitrated loop and employing the virtual arbitrated loop mode to provide multiple virtual NL_Ports 312, the shared FC controller 204 may not perform an explicit fabric logout in response to detecting the absence of a previously present OSD 102; instead, an implicit logout of the virtual NL_Port 312 associated with the missing OSD 102 occurs, such as due to a timeout condition.

Figure 10:
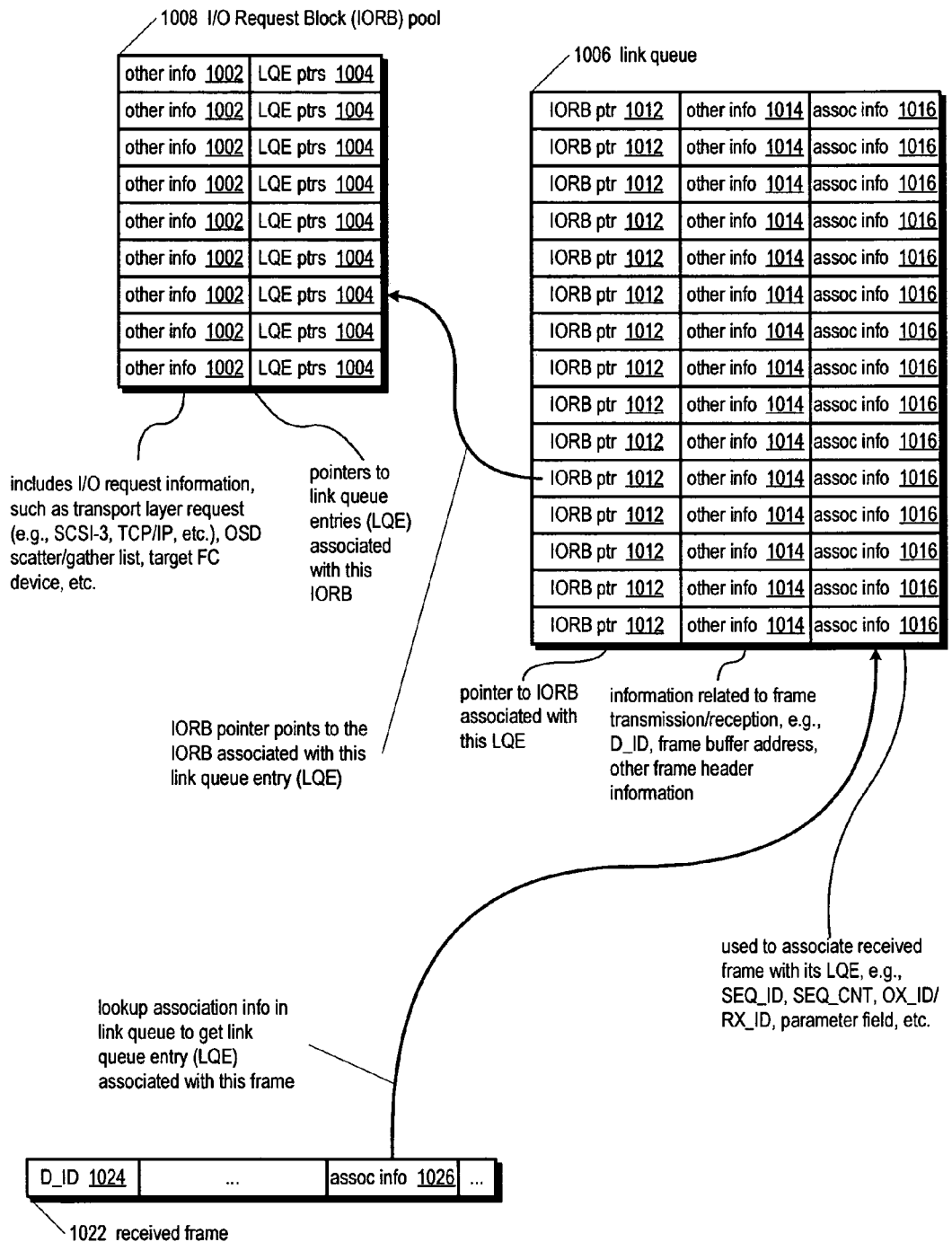
FIG. 10 is a block diagram illustrating data structures used by a conventional FC controller of FIG. 1 to associate a received FC frame to an I/O request block.
Figure 11:
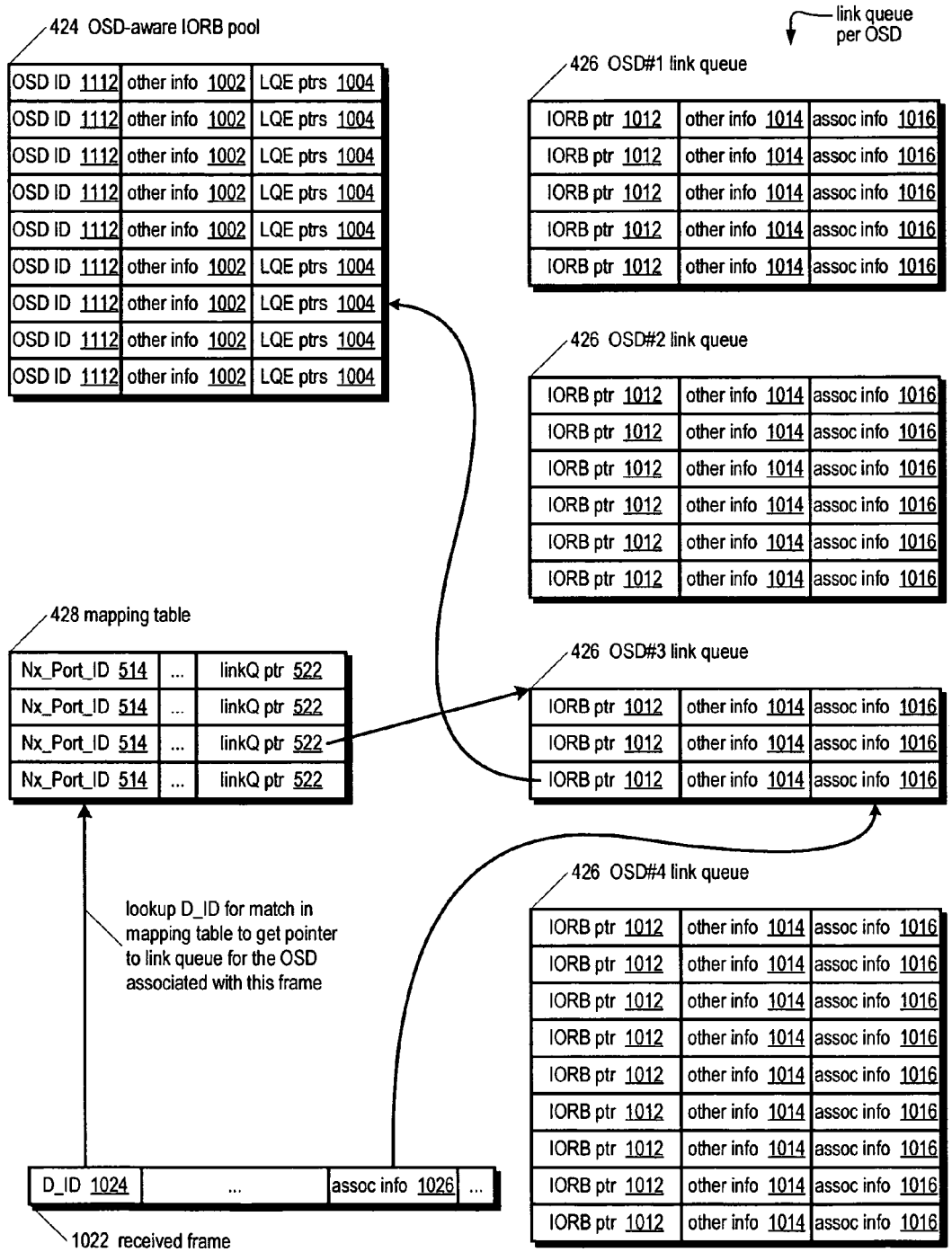
FIG. 11 is a block diagram illustrating data structures used by the shared FC controller of FIG. 2 to associate a received FC frame to an OSD and I/O request block according to the present invention.

FIGS. 10 and 11 will now be discussed together to contrast a generalized conventional FC controller 104 and one embodiment of the shared FC controller 204 of FIG. 2.

Referring now to FIG. 10, a block diagram illustrating data structures used by a conventional FC controller 104 of FIG. 1 to associate a received FC frame to an I/O request block is shown. It is noted that the description is intended to be a generalization of how some FC controllers 104 are believed to operate; however, it is not intended to describe a particular known FC controller 104. The description of a generalized conventional FC controller 104 is provided as a means of illustrating differences between a conventional FC controller 104 and one embodiment of the shared FC controller 204 of the present invention for handling multiple OSDs 102 that share the shared FC controller 204. In particular, the shared FC controller 204 data structures of FIG. 11 include the mapping table 428 of FIG. 4 for associating FC frames with their respective OSDs 102. Furthermore, the embodiment of FIG. 11 also employs multiple link queues 426, one per OSD 102, and the link queue pointer field 522 of the mapping table 428 embodiment of FIG. 5 to associate a FC frame with the link queue 426 associated with the OSD 102 associated with the frame. However, it should be understood that other embodiments are contemplated besides multiple link queues 426 to associate FC frames and their OSDs 102.

The data structures of FIG. 10 include a conventional I/O request block (IORB) pool 1008, a conventional link queue 1006, and a received FC frame 1022. The conventional IORB pool 1008 is an array of conventional IORBs. Each IORB has an other information field 1002 and an LQE pointers field 1004. An IORB is a data structure used to store information relating to, and typically including, an I/O request from an OSD 102 and other housekeeping information needed by the conventional FC controller 104 to process the I/O request from the OSD 102. The other information field 1002 may include, for example, transport layer request information, such as a SCSI-3 or TCP/IP request, a scatter/gather list of memory locations in the OSD 102 memory from which to read or write payload data or the entire FC frame, a target device identifier, such as a FC Nx_Port_ID or SCSI ID/LUN pair or IP address, and the like.

The conventional link queue 1006 is a queue or array of link queue entries (LQEs). Each LQE has an IORB pointer field 1012, an other information field 1014, and an association information field 1016. An LQE is used to store information relating to an action performed by the Nx_Port 112 on its FC link, such as a request to transmit a FC frame and/or information regarding a FC frame that the conventional FC controller 104 expects to receive from another FC device on the FC link. Because an I/O request from an OSD 102 may require multiple actions by the Nx_Port 112 on the FC link, such as the transmission or reception of multiple FC frames, there may be multiple LQEs associated with a given IORB. Consequently, there may be multiple LQE pointers 1004 to multiple corresponding LQEs in a given IORB. For example, assume the conventional FC controller 104 performs redundant array of inexpensive disks (RAID) functionality using a SCSI transport layer protocol. Assume an OSD 102 issues an I/O request with a SCSI READ CDB to read eight logical blocks from a logical unit. The eight logical blocks may be striped across multiple physical FC disks and therefore may require the transmission of a FC frame with a SCSI READ CDB to each of the multiple FC disks and may require reception of one or more FC frames from each of the FC disks. In one embodiment, each frame has an associated LQE. The IORB pointer field 1012 includes a pointer to the IORB in the IORB pool 1008 associated with the LQE. The other information field 1014 includes information related to frame transmission and/or reception, such as the D_ID of a frame to be transmitted, the address of the frame in the frame buffers, and other information needed for populating a frame header or interpreting the header of an incoming frame.

The received FC frame includes a D_ID field 1024 that specifies the Nx_Port_ID of the FC port to which the FC frame is destined. The Nx_Port 112 only receives, i.e., accepts, frames whose D_ID matches its Nx_Port_ID. The received FC frame also includes one or more fields referred to herein as association information 1026. The FC frame association information 1026 is information used by the conventional FC controller 104 to uniquely associate a received FC frame with an LQE in the link queue 1006. When the conventional FC controller 104 receives a frame, it looks up the association information 1026 in the link queue 1006 to find a LQE that has matching association information 1016. The association information 1026/1016 may be any information that uniquely associates the received frame with the LQE, such as the frame SEQ ID, SEQ_CNT, OX_ID/RX_ID, Parameter Field (PARM), or any combination thereof. Furthermore, the association information 1026/1016 may be dependent upon the characteristics of the frame, such as whether the frame is being used in a transport layer protocol, such as SCSI-3 or TCP/IP, and if so may include information specific to the transport layer protocol. In addition, the association information 1026/1016 may be different for different entries in the link queue 1006 depending upon the frame characteristics.

Referring now to FIG. 11, a block diagram illustrating data structures used by the shared FC controller 204 of FIG. 2 to associate a received FC frame to an OSD 102 and I/O request block according to the present invention is shown. FIG. 11 includes the OSD-aware IORB pool 424 of FIG. 4, which is similar to the IORB pool 1008 of FIG. 10; however, each IORB also includes an OSD ID field 1112 that stores the OSD ID of the OSD 102 associated with the IORB. FIG. 11 also includes the mapping table 428 of FIG. 5. Furthermore, FIG. 11 illustrates multiple link queues 426 of FIG. 4, namely one link queue 426 per OSD 102, rather than a single link queue 1006 of the conventional FC controller 104 of FIG. 10.

The process illustrated in FIG. 11 for associating a received frame 1022 with its IORB, and therefore its OSD 102, is similar to the process illustrated in FIG. 10; however, another level of indirection is included to accommodate the sharing of the shared FC controller 204 by the multiple OSDs 102. Because the shared FC controller 204 supports multiple OSDs, the frame association information 1026 name space of the multiple OSDs 102 may overlap. For example, in an embodiment in which the OSD 102 transport layer specifies a value in the FC frame Parameter Field (PARM), which is used as the frame association information 1026, each OSD 102 is free to use the entire 32-bit name space of the Parameter Field, which may result in two or more OSD's 102 using the same value in two outstanding frames. Therefore, as illustrated in FIG. 11, according to one embodiment the shared FC controller 204 provides a separate link queue 426 for each OSD 102 and provides the mapping table 428 for mapping the D_ID 1024 to the respective link queue 426 for the OSD 102 associated with the received frame 1022. When the frame 1022 is received, the processor 436 looks up the frame D_ID in the mapping table 428 and uses the link queue pointer field 522 value of the matching mapping table 428 entry to determine the link queue 426 for the OSD 102 associated with the received frame 1022. From there the process is similar to the conventional FC controller 104; that is, the association information 1026 of the frame is looked up in the selected link queue 426 and the IORB pointer 1012 of the matching LQE is used to determine the IORB associated with the received frame 1022 and its associated OSD ID 1112.

As should be clear from the present specification, the shared FC controller 204 may be similar to a conventional FC controller 104 with at least the following exceptions. The shared FC controller 204 provides a distinct programming interface for each OSD 102 such that the OSDs 102 may concurrently issue I/O requests to the shared FC controller 204 and the shared FC controller 204 may concurrently issue completions to the OSDs 102. The shared FC controller 204 provides a bus or fabric interface that enables the shared FC controller 204 to distinguish which of the OSDs 102 is targeting a transaction at the shared FC controller 204, and that enables the shared FC controller 204 to target transactions at a particular one of the OSDs 102. The shared FC controller 204 provides a means of obtaining a unique FC Nx_Port_ID for each OSD 102. The shared FC controller 204 provides a means of associating the unique FC Nx_Port_ID with its respective OSD 102, such as the mapping table 428 of FIG. 5. The preceding list of differences is not intended to be a complete list of the differences between the shared FC controller 204 and a conventional FC controller 104.

FIGS. 10 and 11 also illustrate another possible difference, namely the employment of multiple link queues 426, i.e., one link queue 426 per OSD 102. However, other means may be used to associate FC frames with their I/O requests and ultimately their OSD 102, besides implementing multiple link queues 426. For example, in one embodiment, the function of the link queues is incorporated into the IORBs of the OSW-aware IORB pool 424 themselves and the link queue pointer 522 in each mapping table 428 entry is dynamically updated to point to the IORB at the head of each OSD's link control block list.

The shared FC controller 204 may also include other differences that are design decisions that may vary based upon design criteria, such as performance targets. For example, the shared FC controller 204 may include a larger amount of memory, such as memory 422, for storing a larger number of data structures since more than one OSD 102 shares the shared FC controller 204. For another example, the shared FC controller 204 allocates resources—such as IORBs from the IORB pool 424, link queue 426 entries, frame buffers 406, and processor 436 bandwidth—in a manner that insures no single OSD 102 is starved for the resources so that forward progress is continually made on the processing of I/O requests for all OSDs 102. In one embodiment, the resources are partitioned equally among the OSDs 102. In another embodiment, a fixed amount of resources are allocated equally among the OSDs 102 and the remainder of the resources are allocated to OSDs 102 on a first-come-first-serve basis so that more active OSDs 102 receive more resources. For another example, the processor 436 processes I/O requests in a fashion that insures fairness of processing among OSDs 102 to avoid an OSD 102 from being starved in the processing of its I/O requests. The invention contemplates the following embodiments, but is not limited thereto. In one embodiment, the processor 436 processes I/O requests in round-robin fashion with respect to OSD 102. In one embodiment, the processor 436 processes I/O requests in a semi-round-robin fashion with respect to OSD 102, giving more or less turns to OSDs 102 in proportion to their number of outstanding I/O requests. In one embodiment, the shared FC controller 204 is a RAID controller that sorts I/O requests based on logical block address per disk drive, such as an elevator algorithm sort to optimize head seek times, independent of OSD 102. In one embodiment, the processor 436 processes I/O requests in semi-round-robin fashion with respect to OSD 102, giving more or less turns to OSDs 102 in proportion to the total amount of data to be transferred as specified in its outstanding I/O requests. Furthermore, the processor 436 may service doorbell interrupts from the various OSDs 102 in a round-robin fashion to insure fairness.

Figure 12:
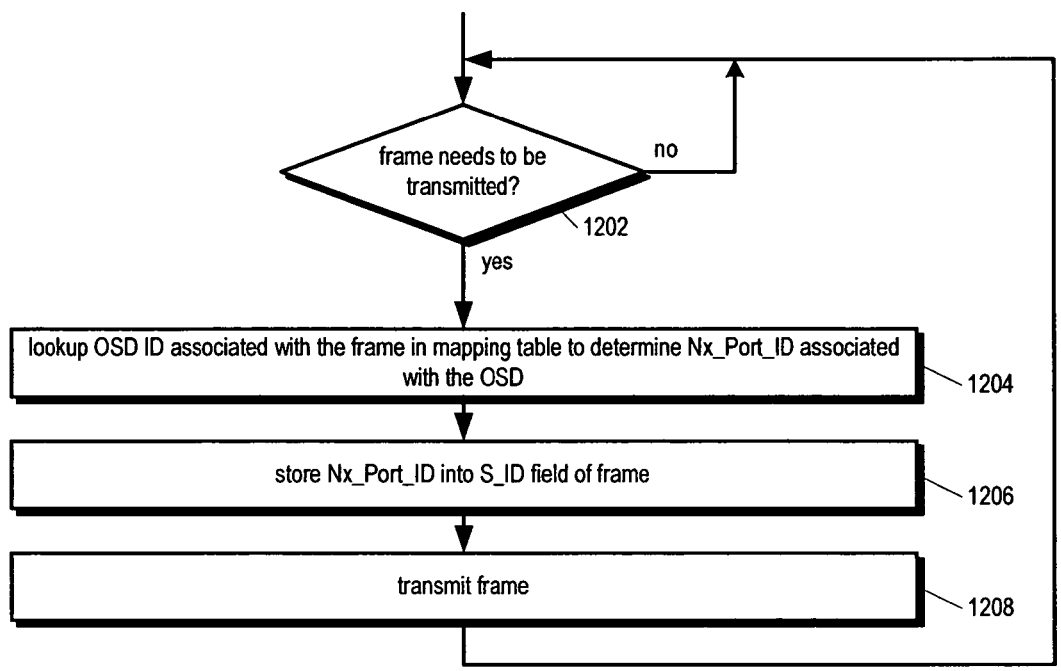
FIG. 12 is a flowchart illustrating operation of the shared FC controller of FIG. 2 for processing outgoing FC frames according to the present invention.

Referring now to FIG. 12, a flowchart illustrating operation of the shared FC controller 204 of FIG. 2 for processing outgoing FC frames according to the present invention is shown. It should be understood that the shared FC controller 204 must perform steps to process an outgoing frame that are well known and are therefore not shown in FIG. 12. FIG. 12 is provided to illustrate steps that are required by a shared FC controller 204 to accommodate processing of I/O requests from multiple OSDs 102 that are not required by a conventional FC controller 104, such as associating one of a plurality of OSDs 102 with its respective unique Nx_Port_ID obtained by the shared FC controller 204 for each OSD 102. Some of the well known steps may include the following. The shared FC controller 204 must build the frame within the frame buffers 406. In the case of a raw frame that the OSD 102 requests be transmitted, the shared FC controller 204 may simply transfer the frame from the OSD 102 memory into the frame buffers 406, such as by using the DMACs 418 of FIG. 4. In the case of a transport layer protocol request, such as a SCSI-3 I/O request, the shared FC controller 204 may construct the frame in the frame buffers 406 almost entirely itself based on the information provided in the I/O request. If the frame includes data, such as associated with a SCSI WRITE CDB, the shared FC controller 204 transfers the data into the payload portion of the frame in the frame buffers 406. Flow beings at decision block 1202.

At decision block 1202, the shared FC controller 204 determines whether a frame needs to be transmitted by the Nx_Port 212 on the FC link 216 for an OSD 102. If no frames need to be transmitted, flow returns to block 1202 to wait until a frame needs to be transmitted; otherwise flow proceeds to block 1204.

At block 1204, the processor 436 looks up the OSD's ID in the mapping table 428 to determine the Nx_Port_ID associated with the OSD 102. Flow proceeds to block 1206.

At block 1206, the processor 436 stores the Nx_Port_ID obtained at block 1204 into the S_ID field of the frame. Flow proceeds to block 1208.

At block 1208, the processor 436 commands the Nx_Port 212 to transmit the frame and the Nx_Port 212 transmits the frame on the FC link 216. Flow ends at block 1208.

Figure 13:
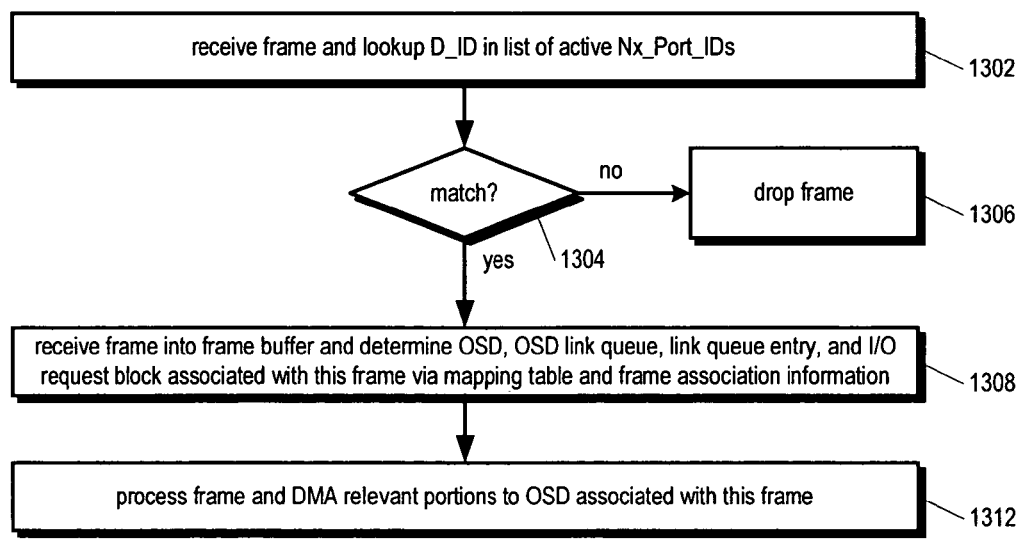
FIG. 13 is a flowchart illustrating operation of the shared FC controller of FIG. 2 for processing incoming FC frames according to the present invention.

Referring now to FIG. 13, a flowchart illustrating operation of the shared FC controller 204 of FIG. 2 for processing incoming FC frames according to the present invention is shown. It should be understood that the shared FC controller 204 must perform steps to process an incoming frame that are well known and are therefore not shown in FIG. 13. FIG. 13 is provided to illustrate steps that are required by a shared FC controller 204 to accommodate processing of I/O requests from multiple OSDs 102 that are not required by a conventional FC controller 104. For example, whereas a conventional FC controller 104 may need to compare the D_ID field value of a frame coming in on its FC link with a single Nx_Port_ID, a shared FC controller 204 must compare the D_ID field value with multiple Nx_Port_IDs, namely the Nx_Port_ID associated with each OSD 102 sharing the shared FC controller 204. In addition, the shared FC controller 204 must associate the Nx_Port_ID in the D_ID field of a received frame, which is one of the unique Nx_Port_IDs obtained by the shared FC controller 204 for each OSD 102, with its respective OSD 102. Some of the well known steps may include the following. The shared FC controller 204 must parse the frame received within the frame buffers 406. In the case of a raw frame, the shared FC controller 204 may simply transfer the frame from the frame buffers 406 to the OSD 102 memory, such as by using the DMACs 418 of FIG. 4. In the case of a frame related to a transport layer protocol request, such as a SCSI-3 I/O request, the shared FC controller 204 parses the information to determine what action to take. If the frame includes data, such as associated with a SCSI READ CDB, the shared FC controller 204 transfers the data from the payload portion of the frame in the frame buffers 406 to the OSD 102 memory. If the frame includes command completion information, such as a SCSI GOOD status, the shared FC controller 204 may complete the I/O request by providing I/O request completion status to the OSD 102 and interrupting the OSD 102. If the frame includes command completion information, such as a SCSI CHECK_CONDITION status, the shared FC controller 204 may perform error processing, such as issuing a SCSI REQUEST SENSE command to obtain SCSI sense data from the remote device, before completing the I/O request to the OSD 102. Some of these steps may be included in block 1312 below. Flow begins at block 1302.

At block 1302, the Nx_Port 212 receives a frame on the FC link 216 and looks up the frame D_ID field 1024 value in its list of active Nx_Port_IDs 414 of FIG. 4. That is, the processor 436 compares the frame D_ID field 1024 value to each of the Nx_Port_IDs in the active list 414 to determine if they are equal. It is noted that if an OSD 102 is no longer present, then the Nx_Port_ID of the no longer present OSD 102 is removed from the active list 414, as described above with respect to FIG. 9; consequently, the D_ID field 1024 value will not be found in the active list 414, i.e., the D_ID field 1024 value will not be equal to the Nx_Port_ID of the no longer present OSD 102 that is no longer in the active list 414. Flow proceeds to decision block 1304.

At decision block 1304, the Nx_Port 212 determines whether a match has occurred during the lookup at block 1302. If so, flow proceeds to block 1308; otherwise, flow proceeds to block 1306.

At block 1306, the Nx_Port 212 drops the frame, i.e., does not accept the frame into the frame buffers 406, because the frame is not destined for the shared FC controller 204. Flow ends at block 1306.

At block 1308, the Nx_Port 212 accepts the frame into the frame buffers 406 and notifies the processor 436. In one embodiment, the processor 436 determines the OSD 102 associated with the frame, its OSD ID, its link queue 426, and associated IORB based on the D_ID field value, the frame association information 1026, and the mapping table 428, as described in FIG. 11. Flow proceeds to block 1312.

At block 1312, the processor 436 processes the frame according to well known steps, such as those described above. However, the shared FC controller 204 distinctively performs the processing of the frame with respect to a particular OSD 102. In particular, the processor 436 must transfer the relevant portions of the frame to the OSD 102 associated with the frame, such as by providing to one of the DMACs 418 the OSD ID of the OSD 102 associated with the frame so that the OSD ID may be included in the data transfer transaction on the OSD-aware load-store bus 206; storing one or more I/O request completion values in the respective bank of CSRs 416 associated with the OSD 102; and providing to the CSRs 416 and/or bus interface/OSD ID logic 404 the OSD ID of the OSD 102 to be interrupted so that the OSD ID may be included in the interrupt transaction on the OSD-aware load-store bus 206. Flow ends at block 1312.

Figure 14:
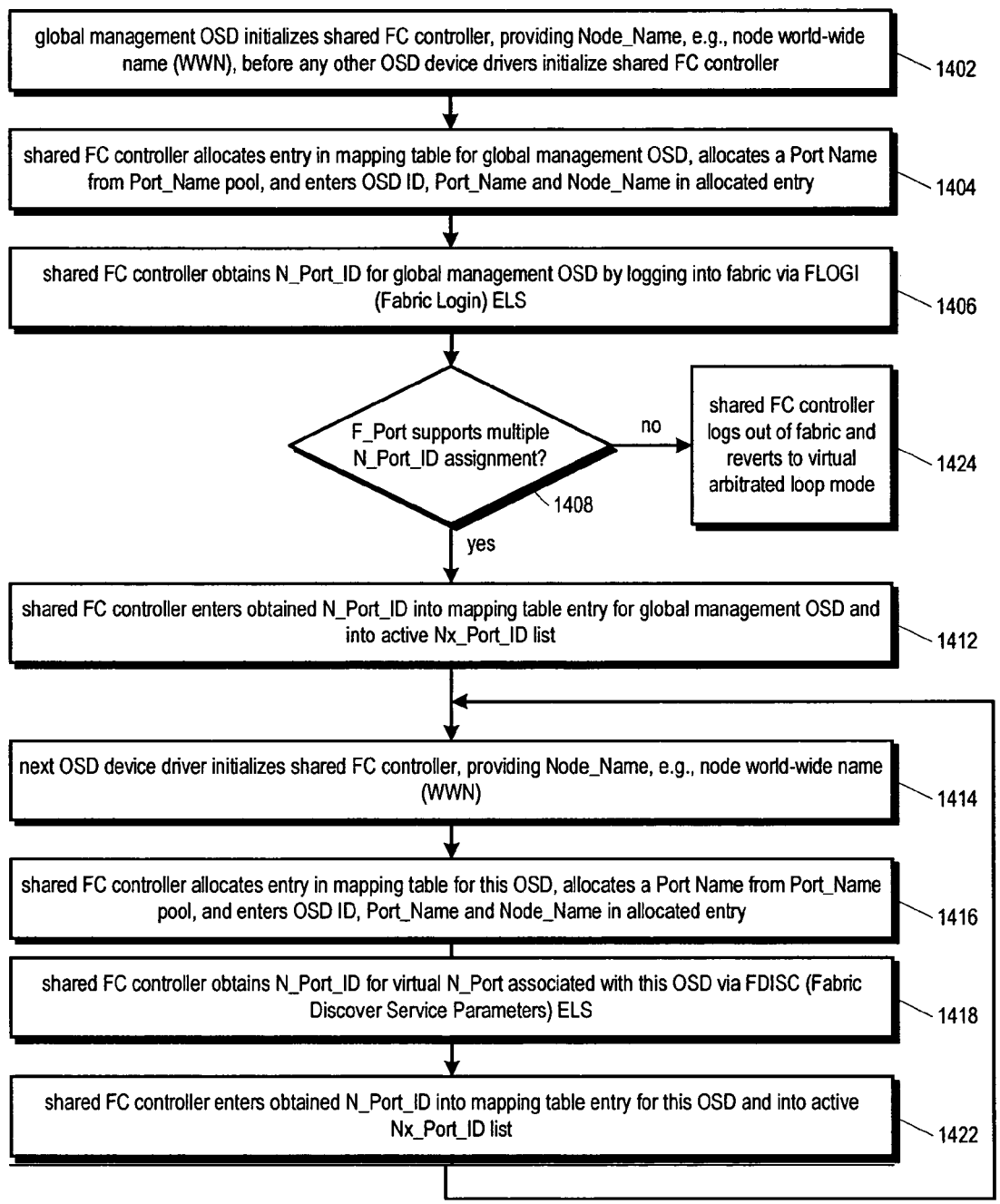
FIG. 14 is a flowchart illustrating operation of the shared FC controller of FIG. 2 in multiple N_Port_ID assignment mode to obtain multiple N_Port_IDs according to an alternate embodiment of the present invention.

Referring now to FIG. 14, a flowchart illustrating operation of the shared FC controller 204 of FIG. 2 in multiple N_Port_ID assignment mode to obtain multiple N_Port_IDs according to an alternate embodiment of the present invention is shown. The flowchart of FIG. 14 illustrates operation of the shared FC controller 204 configured in a multiple N_Port_ID assignment mode as shown in FIG. 7 and is similar in many respects to the flowchart of FIG. 8. However, in the embodiment of FIG. 14, one of the OSDs 102 functions as a global management OSD 102.

In one embodiment, the global management OSD 102 is distinguished by a distinct OSD ID provided on the OSD-aware load-store bus 206. In one embodiment, the global management OSD comprises a device driver that executes on one of the OSDs 102 but is distinguished from a normal FC device driver in one of a number of ways. For example, the global management OSD 102 may access a set of CSRs that are only provided for the global management OSD 102 and are not provided for the FC device drivers on a per-OSD basis and are not visible to the FC device drivers. For another example, the global management OSD 102 issues commands to the shared FC controller 204 that are unique management commands not issued by normal FC device drivers. The global management OSD 102 may comprise, but is not limited to, a modified normal FC device driver; a distinct device driver that normal FC device drivers call to access the shared FC controller 204; a stored program comprised within the shared I/O switch 202, or comprised in the shared FC controller 204 itself. Flow begins at block 1402.

At block 1402, the global management OSD 102 device driver initializes the shared FC controller 204 by performing load-store transactions to the shared FC controller 204 programming interface. Flow proceeds to block 1404.

At block 1404, the shared FC controller 204 allocates an entry in the mapping table 428 for the global management OSD 102. The shared FC controller 204 also allocates a unique Port_Name for the global management OSD 102 from the Port_Name pool 432 of FIG. 4. In one embodiment, the global management OSD 102 device driver provides the Port_ Name 518 in addition to the Node_Name 516, rather than the shared FC controller 204 providing the Port_Name 518. The shared FC controller 204 then enters the global management OSD ID, Port_Name, and Node_Name into the allocated entry in the mapping table 428. Flow proceeds to block 1406.

At block 1406, the shared FC controller 204 performs a FLOGI ELS to obtain from the FC fabric 108 an N_Port_ID for the global management OSD 102. Flow proceeds to decision block 1408.

At decision block 1408, the shared FC controller 204 examines the Multiple N_Port_ID Assignment bit in the service parameters in the LS_ACC packet returned by the F_Port 114 of the FC fabric 108 to determine whether the F_Port 114 supports the Multiple N_Port_ID Assignment feature. If not, flow proceeds to block 1424; otherwise, flow proceeds to block 1412.

At block 1412, the shared FC controller 204 enters the N_Port_ID obtained at block 1406 into the mapping table 428 entry for the global management OSD 102 and enters the N_Port_ID obtained for the global management OSD 102 into the list of active Nx_Port_IDs 414. Flow proceeds to block 1414.

At block 1414, an OSD 102 device driver for controlling a virtual FC controller 304 of FIG. 7 of the shared FC controller 204 initializes the shared FC controller 204. Flow proceeds to block 1416.

At block 1416, the shared FC controller 204 allocates an entry in the mapping table 428 for the OSD 102 performing the initialization. The shared FC controller 204 also allocates a unique Port_Name for the OSD 102 from the Port_Name pool 432 of FIG. 4. The shared FC controller 204 then enters the OSD ID, Port_Name, and Node_Name into the allocated entry in the mapping table 428. Flow proceeds to block 1418.

At block 1418, the shared FC controller 204 performs a Fabric Discover Service Parameters (FDISC) ELS to obtain from the FC fabric 108 an N_Port_ID for the virtual N_Port 712 associated with the OSD 102. Flow proceeds to block 1422.

At block 1422, the shared FC controller 204 enters the N_Port_ID obtained at block 1408 into the mapping table 428 entry for the OSD 102 and enters the N_Port_ID obtained for the OSD 102 into the list of active Nx_Port_IDs 414. Flow returns to block 1414 to service the next OSD 102 device driver initialization. It is noted that, the global management OSD 102 may be removed in the process of N_Port_IDs being obtained for the non-global management OSDs 102 during blocks 1414 through 1422, in response to which the global management OSD 102 will be logged out of the fabric for its N_Port_ID, along with the other actions as described above with respect to FIG. 9; however, the remaining OSDs 102 will continue to share the shared FC controller 204 using the N_Port_IDs obtained for them.

At block 1424, the shared FC controller 204 logs out of the FC fabric 108 via a Logout (LOGO) ELS and reverts to virtual arbitrated loop mode, as described with respect to FIGS. 3 and 6 above, because the F_Port 114 does not support the Multiple N_Port_ID Assignment feature. Flow ends at block 1424.

Figure 15:
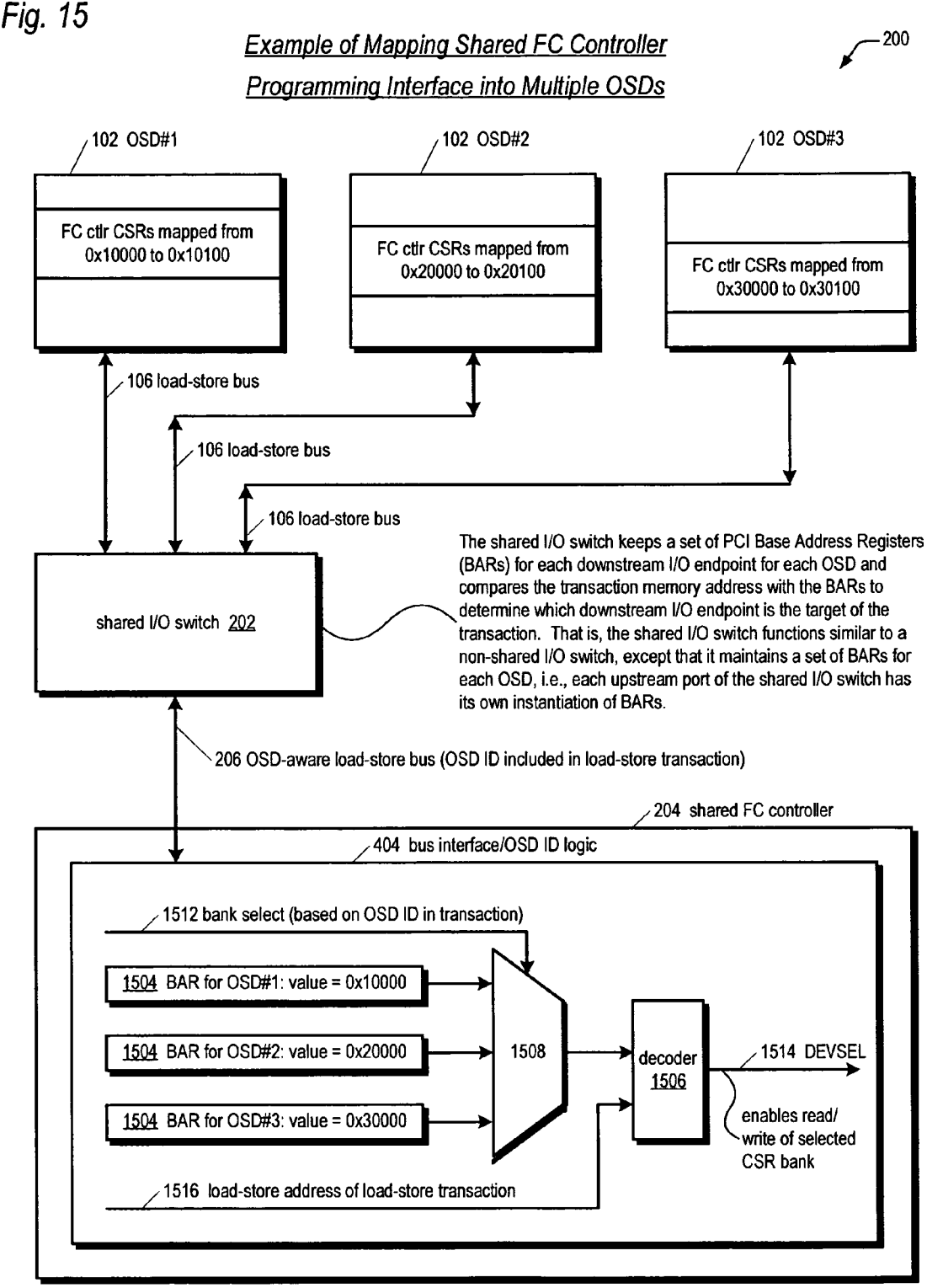
FIG. 15 is a block diagram of the system 200 of FIG. 2 illustrating in detail portions of the bus interface/OSD ID logic of FIG. 4 and an example of mapping the shared FC controller programming interface into multiple system load-store memory maps of the OSDs according to the present invention.

Referring now to FIG. 15, a block diagram of the system 200 of FIG. 2 illustrating in detail portions of the bus interface/OSD ID logic 404 of FIG. 4 and an example of mapping the shared FC controller 204 programming interface into multiple system load-store memory maps of the OSDs according to the present invention is shown.

The system 200 includes three of the OSDs 102 coupled by respective load-store buses 106 to the shared I/O switch 202 of FIG. 2 which is coupled to the shared FC controller 204 by the OSD-aware load-store bus 206, and particularly to the bus interface/OSD ID logic 404. The bus interface/OSD ID logic 404 includes a plurality of base address registers (BARs) 1504, such as PCI BARs, for storing the base address and length of the CSRs 416 for each of the plurality of OSDs 102. In non-PCI embodiments, the shared FC controller 204 may include storage elements other than BARs that serve a similar function, namely to enable the OSDs 102 to map the shared FC controller 204 programming interface into different locations within each OSD's 102 respective system load-store memory map. In the example of FIG. 15, three BARs 1504 are shown. However, the shared FC controller 204 includes N banks of BARs 1504, where N is the maximum number of OSDs 102 supportable by the shared FC controller 204. The bus interface/OSD ID logic 404 also includes a multiplexer 1508 coupled to receive the output of each of the BARs 1504. The multiplexer 1508 also receives a bank select input 1512 that controls the multiplexer 1508 to select on its output the appropriate BAR 1504 based on the OSD ID in the transaction. The output of the multiplexer 1508 is provided to a decoder 1506, which also receives the load-store address of the load-store transaction provided by the shared I/O switch 202 on the OSD-aware load-store bus 206 to the shared FC controller 204. The decoder 1506 generates a DEVSEL signal 1514, which in one embodiment may correspond to a PCI DEVSEL signal, to indicate whether the load-store transaction is targeted for the shared FC controller 204. The decoder 1506 is similar to well known decoders 1506 such as used in PCI interfaces. The DEVSEL signal 1514 is also used to enable a read or write of the bank of CSRs 416 selected by the multiplexing/demultiplexing circuitry 444 of FIG. 4.

In the example of FIG. 15, each bank of CSRs occupies 256 bytes of the OSD 102 system load-store memory map. In the example, the bank of CSRs 416 of the shared FC controller 204 associated with OSD#1 102 are mapped into its address memory map from 0x10000 to 0x10100; the bank of CSRs 416 of the shared FC controller 204 associated with OSD#2 102 are mapped into its address memory map from 0x20000 to 0x20100; and the bank of CSRs 416 of the shared FC controller 204 associated with OSD#3 102 are mapped into its address memory map from 0x30000 to 0x30100. Consequently, the BAR 1504 for OSD#1 stores a value of 0x10000, the BAR 1504 for OSD#2 stores a value of 0x20000, and the BAR 1504 for OSD#3 stores a value of 0x30000. Although the example of FIG. 15 illustrates memory-mapped CSRs 416, the CSRs 416 could also be mapped into I/O space. Although only BARs 1504 are shown in FIG. 15, other required configuration registers also may be replicated for each OSD 102, depending upon the type of the OSD-aware load-store bus 206.

As may be observed from FIG. 15, the shared FC controller 204 advantageously is configured with multiple banks of configuration registers for enabling multiple OSDs 102 to share the shared FC controller 204 and to map the shared FC controller 204 programming interface into different locations within each OSD's 102 respective system load-store memory map as needed. This is advantageous because it allows the shared FC controller 204 to be shared by a plurality of OSDs 102 with little or no modification to existing system configuration software. In particular, advantageously the OSDs 102 need not coordinate with one another to configure the shared FC controller 204 into the same location within each of their system load-store memory maps, but may instead concurrently submit I/O requests to the shared FC controller 204. Nevertheless, it is not intended that embodiments be excluded in which the OSDs 102 are required to map the shared FC controller 204 programming interface to the same base address in their system load-store memory map. In such an embodiment, the BARs 1504 need not be duplicated, thereby potentially enabling the shared FC controller 204 to be smaller and/or have less cost.

Although an embodiment of the shared FC controller 204 of the present invention has been described in which the OSD-aware load-store bus 206 is a PCI family bus, the invention is not limited to a shared FC controller 204 for coupling to a PCI family bus; rather, the shared FC controller 204 may be controlled by a plurality of OSDs 102 via other load-store local buses, and in particular other load-store buses whose programming interfaces are mapped into the load-store domain address space in a different manner than PCI family buses. For example, although PCI family buses provide for dynamic configuration of programming interface address ranges by the OSDs 102, the programming interface address ranges of other buses may be statically configured, such as via jumpers.

In an embodiment in which the OSD-aware load-store bus 206 is a point-to-point bus such as a PCI Express+ bus, the shared I/O switch 202 is responsible for routing to the shared FC controller 204 only transactions that are targeted for the shared FC controller 204; hence, the shared FC controller 204 should not receive transactions that are not targeted for it. However, in an embodiment in which the OSD-aware load-store bus 206 is an OSD-aware shared bus (such as an OSD-aware PCI-X bus) rather than a point-to-point bus (such as a PCI Express+ bus), the DEVSEL signal 1514 may also be provided to the OSD-aware load-store bus 206 to indicate acceptance of the transaction by the shared FC controller 204 as its target.

Figure 16:
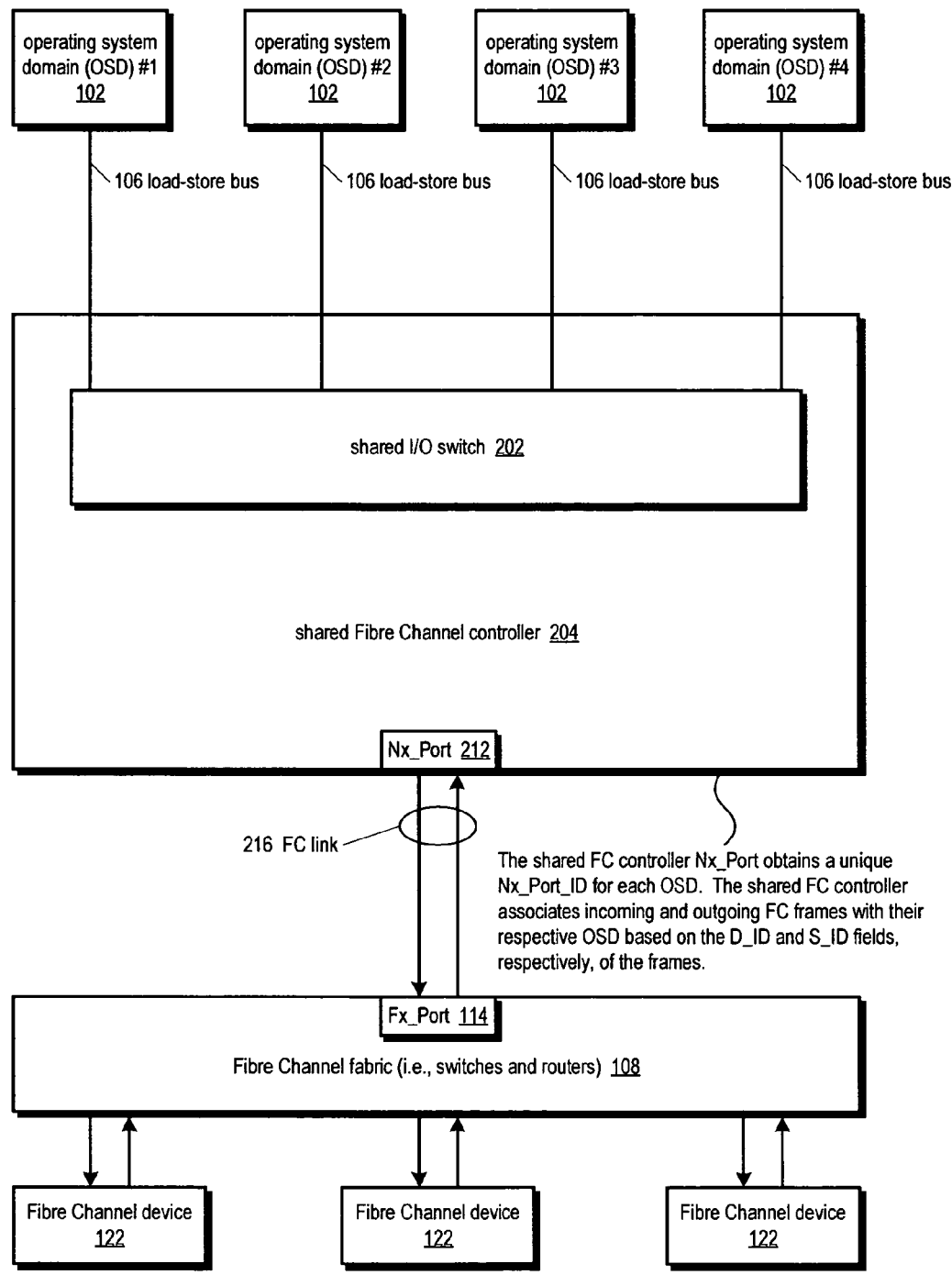
FIG. 16 is a block diagram illustrating a computer system including a shared FC controller that is shared by a plurality of OSDs according to an alternate embodiment of the present invention.

Referring now to FIG. 16, a block diagram illustrating a computer system 1600 including a shared FC controller 204 that is shared by a plurality of OSDs 102 according to an alternate embodiment of the present invention is shown. The system 1600 of FIG. 16 is similar to the system 200 of FIG. 2; however, the shared FC controller 204 comprises the shared I/O switch 202, rather than the shared I/O switch 202 being distinct from the shared FC controller 204. Thus, in the system 1600 of FIG. 16, each of the OSDs 102 is coupled to the shared FC controller 204 directly via a non-OSD-aware load-store bus 106, and the shared FC controller 204 includes a plurality of non-OSD-aware interfaces for coupling with the plurality of OSDs 102. In one embodiment, the OSD-aware load-store bus 206 is located within the shared FC controller 204 for internally coupling the shared I/O switch 202 to an internal bus interface/OSD ID logic 404. In another embodiment, the shared I/O switch 202 performs the selection process similar to the bus interface/OSD ID logic 404 and multiplexing/demultiplexing circuitry 444 and bank select signal 442 of FIG. 4 and directs the load-store transactions directly to the appropriate CSR bank 416, or memory, of the programming interface.

Figure 17:
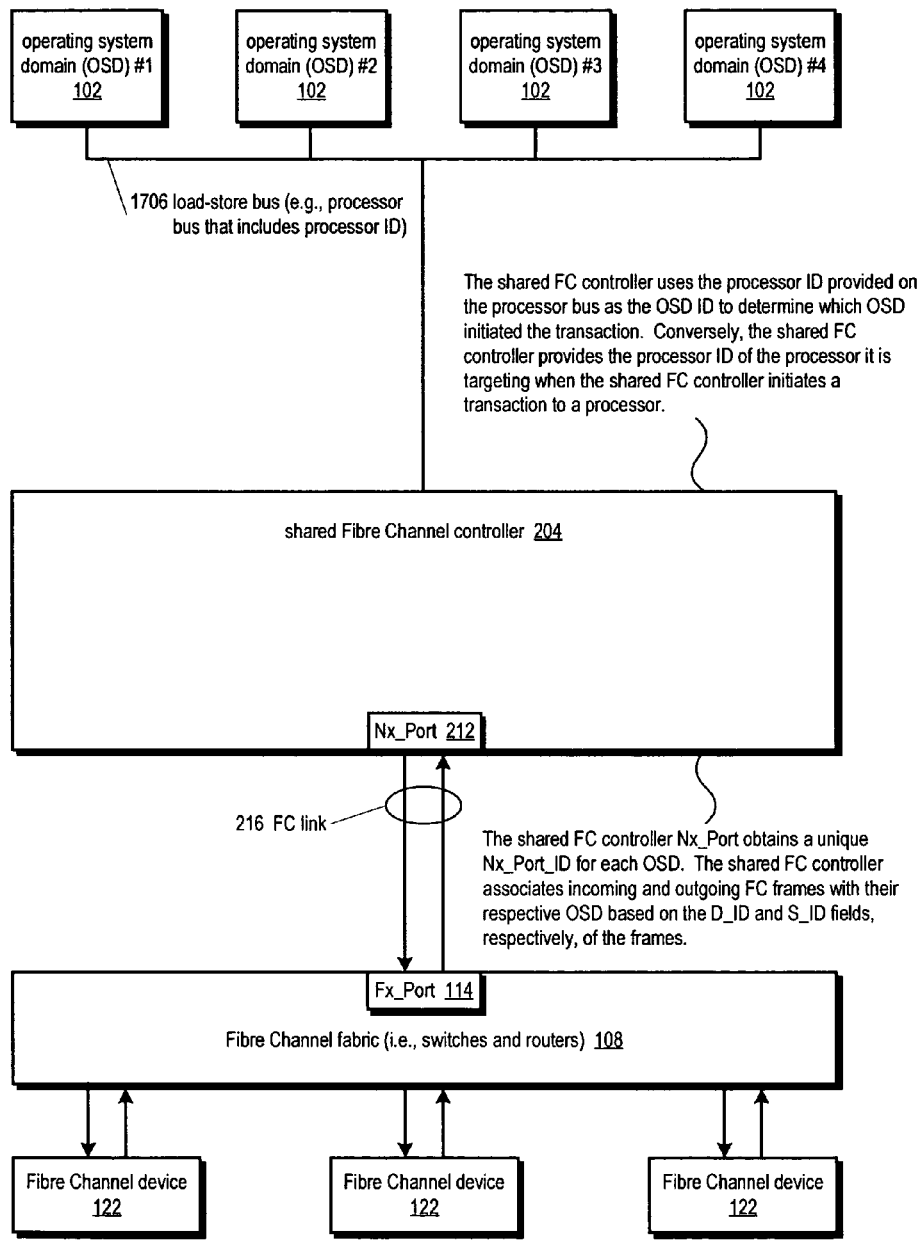
FIG. 17 is a block diagram illustrating a computer system including a shared FC controller that is shared by a plurality of OSDs according to an alternate embodiment of the present invention.

Referring now to FIG. 17, a block diagram illustrating a computer system 1700 including a shared FC controller 204 that is shared by a plurality of OSDs 102 according to an alternate embodiment of the present invention is shown. The system 1700 of FIG. 17 is similar to the system 200 of FIG. 2; however, the system 1700 does not include a shared I/O switch 202. Instead the various OSDs 102 share a common load-store bus 1706, such as a processor bus, or front-side bus. The load-store bus 1706 includes in each transaction the processor ID of the OSD 102 initiating the transaction. The shared FC controller 204 is coupled to the load-store bus 1706 via bus interface/OSD ID logic similar to the bus interface/OSD ID logic 404 of FIG. 4. However, the shared FC controller 204 is configured to use the processor ID provided on the load-store bus 1706 as the OSD ID for determining which OSD 102 initiated the transaction on the load-store bus 1706, and in particular, to select one of the CSR banks 416 (and memory, if present) associated with the appropriate OSD 102, similar to the manner described above. Conversely, when the shared FC controller 204 initiates a transaction on the load-store bus 1706, the shared FC controller 204 provides on the load-store bus 1706 the processor ID of the OSD 102 which is the target of the transaction.

Figure 18:
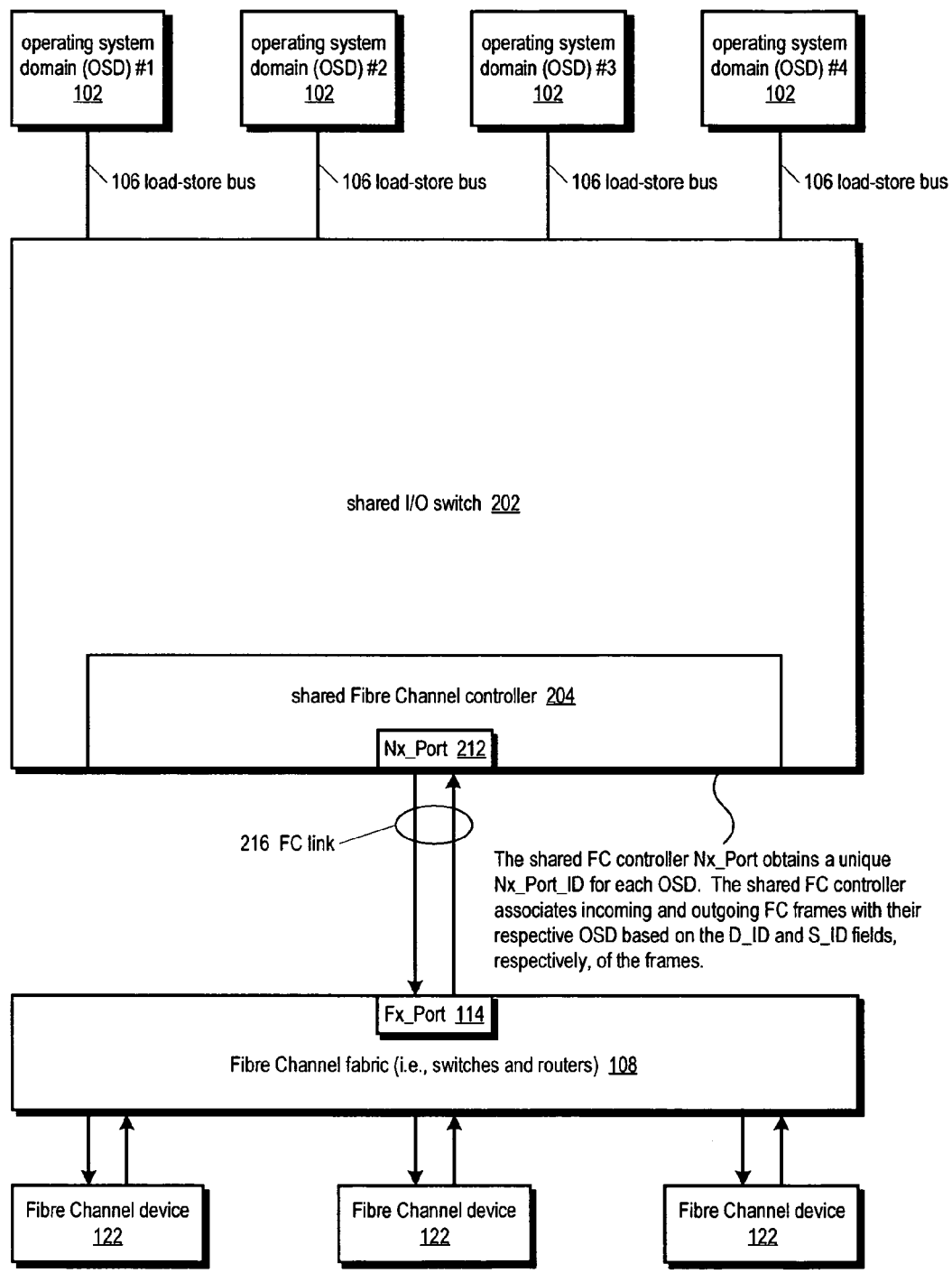
FIG. 18 is a block diagram illustrating a computer system including a shared FC controller that is shared by a plurality of OSDs according to an alternate embodiment of the present invention.

Referring now to FIG. 18, a block diagram illustrating a computer system 1800 including a shared FC controller 204 that is shared by a plurality of OSDs 102 according to an alternate embodiment of the present invention is shown. The system 1800 of FIG. 18 is similar to the system 200 of FIG. 2; however, the shared I/O switch 202 comprises the shared FC controller 204, rather than the shared FC controller 204 being distinct from the shared I/O switch 202. Thus, in the system 1800 of FIG. 18, the FC fabric 108 is coupled to the shared FC controller 204 within the shared I/O switch 202. In one embodiment, the OSD-aware load-store bus 206 is located within the shared I/O switch 202 for internally coupling to an internal bus interface/OSD ID logic 404 of the shared FC controller 204. In another embodiment, the shared I/O switch 202 performs the selection process similar to the bus interface/OSD ID logic 404 and multiplexing/demultiplexing circuitry 444 and bank select signal 442 of FIG. 4 and directs the load-store transactions directly to the appropriate CSR bank 416, or memory, of the programming interface.

Figure 19:
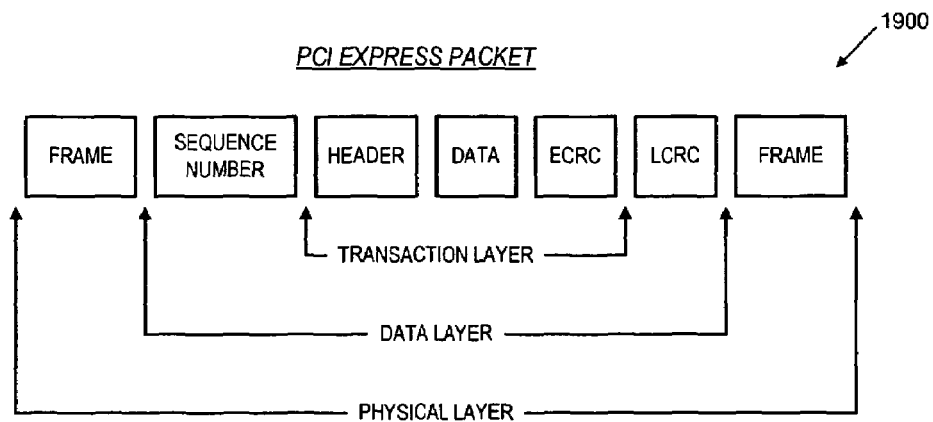
FIG. 19 is a block diagram of a PCI Express packet.

Referring now to FIG. 19, a block diagram of a PCI Express packet 1900 is shown. The details of each of the blocks in the PCI Express packet 1900 are thoroughly described in the *PCI Express Base Specification* 1.0a published by the PCI Special Interest Group (PCI-SIG), 5440 SW Westgate Dr. #217, Portland, Oreg., 97221 (Phone: 503-291-2569). The specification is available online at URL http://www.pcisig.com. The *PCI Express Base Specification* 1.0a is incorporated herein by reference for all intents and purposes. In addition, it is noted that the *PCI Express Base Specification* 1.0a references additional errata, specifications, and documents that provide further details related to PCI Express.

Figure 20:
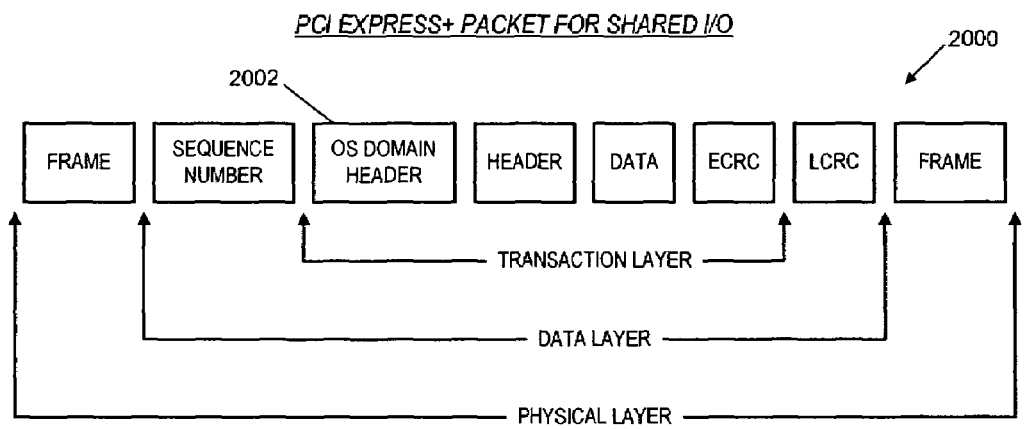
FIG. 20 is a block diagram of a PCI Express+ packet according to the present invention.

Referring now to FIG. 20, a block diagram of a PCI Express+ packet 2000 according to the present invention is shown. More specifically, the PCI Express+ packet 2000 includes an OSD header 2002 encapsulated within a transaction layer sub-portion of the PCI Express packet 1900 of FIG. 9. The PCI Express+ packet 2000 is otherwise identical to a conventional PCI Express packet 1900, except for encapsulation of the OSD header 2002 which designates that the associated PCI Express transaction is to be associated with a particular OSD 102. According to the present invention, an architecture is provided that enables multiple OSDs 102 to share I/O switches, I/O controllers, and/or I/O devices over a single fabric that would otherwise provide only for transactions associated with a single OSD (i.e., load-store domain). By encapsulating the OSD header 2002 into downstream packets 2000—whether generated by a shared I/O switch, a shared I/O aware root complex, or a shared I/O aware processing complex—a transaction can be designated as originating from a specific OSD 102. It is noted that the PCI Express+ packet 2000 is only one embodiment of a mechanism for identifying, isolating, and segregating transactions according to operating system domains within a shared I/O environment. PCI Express is a useful load-store architecture for teaching the present invention because of its wide anticipated use within the industry. However, one skilled in the art should appreciate that the association of load-store transactions with operating system domains within a shared I/O environment can be accomplished in other ways according to the present invention. For another example, a set of signals designating operating system domain can be provided on a bus, or current signals can be redefined to designate operating system domain. Within the existing PCI architecture, one skilled might redefine an existing field (e.g., reserved device ID field) to designate an operating system domain associated with a particular transaction. What is important is that a shared I/O endpoint, such as the shared FC controller 204, receive information in each load-store request that enables the shared I/O endpoint to determine which of the plurality of OSDs 102 initiated the load-store transaction, and that the shared I/O endpoint have a means for targeting transactions, or responses thereto, to each specific OSD 102. Specifics of the OSD header 2002 are provided below in FIG. 21, to which attention is now directed.

Figure 21:
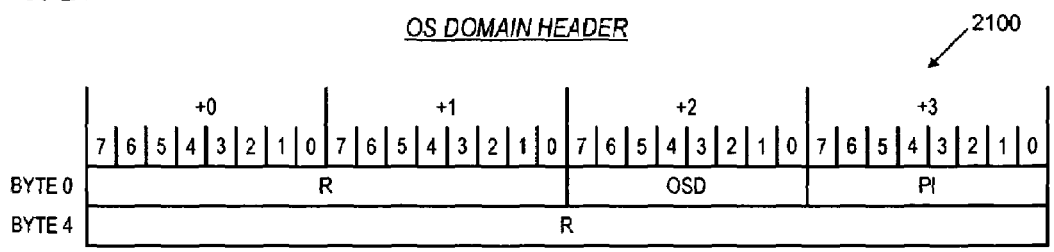
FIG. 21 is a block diagram illustrating one embodiment of an OSD header which is encapsulated within a PCI Express packet to generate a PCI Express+ packet according to the present invention.

Referring now to FIG. 21, a block diagram illustrating one embodiment of an OSD header 2100 which is encapsulated within a PCI Express packet 1900 to generate a PCI Express+ packet 2000 according to the present invention is shown. The OSD header 2100 is decapsulated from a PCI Express+ packet 2000 to generate a PCI Express packet 1900. In one embodiment, the OSD header 2100 comprises eight bytes which include 6 bytes that are reserved (R), one byte allocated as a Protocol ID field (PI), and eight bits allocated to designating an OSD number, or OSD ID. The OSD ID is used to associate a transaction packet with its originating or destination OSD 102. An 8-bit OSD ID field is thus capable of identifying 256 unique OSDs 102 to a shared I/O endpoint device, a shared I/O aware root complex or processing complex, or a shared I/O switch according to the present invention. Although an 8-bit OSD ID field is depicted in the OSD header 2100 of FIG. 21, one skilled in the art will appreciate that the present invention should not be restricted to the number of bits allocated within the embodiment shown. Rather, what is important is that a means of associating a shared transaction with its origin or destination OSD 102 be established to allow the sharing and/or partitioning of I/O controllers/devices.

In an alternative embodiment, the OSD ID is used to associate a downstream or upstream port with a PCI Express+ packet. That is, where a packet must traverse multiple links between its origination and destination, a different OSD ID may be employed for routing of a given packet between a port pair on a given link than is employed for routing of the packet between a port pair on another link. Although different OSD IDs are employed within the packet when traversing multiple links, such an aspect of the present invention still provides for uniquely identifying the packet so that it remains associated with its intended OSD 102.

Additionally, within the OSD header 2100, are a number of reserved (R) bits. It is conceived by the present inventors that the reserved bits have many uses. Accordingly, one embodiment of the present invention employs one or more of the reserved bits to track coherency of messages within a load-store fabric. Other uses of the reserved bits are contemplated as well. For example, one embodiment envisions use of the reserved (R) bits to encode a version number for the PCI Express+protocol that is associated with one or more corresponding transactions.

In an exemplary embodiment, a two level table lookup is provided. More specifically, an OSD ID is associated with a PCI Express bus hierarchy. The PCI bus hierarchy is then associated with a particular upstream or downstream port. In this embodiment, normal PCI Express discovery and addressing mechanisms are used to communicate with downstream shared I/O switches and/or shared I/O devices, such as shared FC controller 204. Accordingly, sharing logic within a shared I/O switch 202 (or shared I/O aware root complex or processing complex) maps particular PCI bus hierarchies to particular shared I/O endpoints, such as shared FC controller 204, to keep multiple OSDs 102 from seeing more shared I/O endpoints than have been configured for them by the shared I/O switch 202. All variations which associate a transaction packet with an OSD 102 are contemplated by the present invention.

In a PCI Express embodiment, the OSD header 2100 may be the only additional information included within a PCI Express packet 1900 to form a PCI Express+packet 2000. Alternatively, the present invention contemplates other embodiments for associating transactions with a given OSD. For instance, a "designation" packet may be transmitted to a shared I/O device that associates a specified number of following packets with the given OSD.

In another embodiment, the contents of the OSD header 2100 are first established by the shared I/O switch 202 by encapsulating the port number of the shared I/O switch 202 that is coupled to the upstream OSDs 102 from which a packet originated, or for which a packet is intended, as the OSD ID. But other means of associating packets with their origin/destination OSD are contemplated. One alternative is for each OSD 102 that is coupled to the shared I/O switch 202 to be assigned a unique ID by the shared I/O switch 202 to be used as the OSD ID. Another alternative is for an OSD 102 to be assigned a unique ID, either by the shared I/O switch 202, or by any other mechanism within or external to the OSD 102 which is then used in packet transfer to the shared I/O switch (or downstream shared I/O controllers).

Although embodiments have been described in which the interface or port to the fabric, or network, is a Fibre Channel port, other embodiments are contemplated in which the shared controller 204 described herein is modified to interface to any network, existing now or developed in the future, whose protocol enables the port or interface to obtain multiple port IDs for itself, namely a port ID per OSD 102, so that frames or packets transceived on the network or fabric may be associated with multiple OSDs 102 to enable the multiple OSDs 102 to share the network port or interface via the multiple programming interfaces as described herein. For example, embodiments are contemplated in which the interface or port to the fabric or network is an Infiniband port.

It is also envisioned that the encapsulation of an OSD ID within a load-store fabric transaction, as described above, could be further encapsulated within another load-store fabric yet to be developed, or could be further encapsulated, tunneled, or embedded within a channel-based fabric such as Advanced Switching (AS) or Ethernet. AS is a multi-point, peer-to-peer switched interconnect architecture that is governed by a core AS specification along with a series of companion specifications that define protocol encapsulations that are to be tunneled through AS fabrics. These specifications are controlled by the Advanced Switching Interface Special Interest Group (ASI-SIG), 5440 SW Westgate Drive, Suite 217, Portland, Oreg. 97221 (Phone: 503-291-2566). For example, within an AS embodiment, the present invention contemplates employing an existing AS header that specifically defines a packet path through an I/O switch according to the present invention. Regardless of the fabric used downstream from the OSD, the inventors consider any utilization of the method of associating one of a plurality of port IDs of a shared I/O endpoint port, such as of a shared FC controller, with a respective one of a plurality of OSDs to be within the scope of their invention, as long as the shared I/O endpoint is mapped within the system load-store memory map of the OSD. Thus, for example, in one embodiment, the bus interface/OSD ID logic of the shared FC controller may be configured for coupling to an AS fabric to receive AS packets. The AS packets encapsulate load-store transactions generated by the OSDs. The AS packets also include an OSD identifier identifying the OSD that generated the load-store transaction. The AS packets include a packet path to the shared FC controller and are switched through the AS fabric thereto. The load-store transactions are addressed to the controller CSRs mapped into the respective system load-store memory maps of the OSDs. The bus interface/OSD ID logic extracts the load-store transaction from the AS packet and directs the load-store transaction to the CSR bank associated with the OSD based on the OSD ID. The shared FC controller associates the OSDs with their respective FC port IDs as described with respect to the various embodiments herein.

While not particularly shown, one skilled in the art will appreciate that many alternative embodiments may be implemented which differ from the above description, while not departing from the scope of the invention as claimed. For example, the shared FC controller 204 described herein may be used in a manner similar to the shared SATA controller described with respect to FIG. 4 of the parent U.S. patent application Ser. No. 10/864,766 (Docket NEXTIO.0310) entitled METHOD AND APPARATUS FOR A SHARED I/O SERIAL ATA CONTROLLER. In particular, one or more of the OSDs 102 may be linked together as a redundant fault-tolerant mirrored server pair that shares access to a set of FC disk drives configured as mirrored RAIDs via the shared FC controller 204, with the concomitant benefits described therein. For another example, the shared I/O switch 202 of FIG. 2 that routes OSD 102 transactions to the shared FC controller 204 may be incorporated into a system-on-chip (SOC) with one or more of the OSDs 102, as described with respect to FIG. 5 of parent application Ser. No. 10/864,766 (Docket NEXTIO.0310), for enabling two or more OSDs 102 to share the shared FC controller 204.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A controller shareable by a plurality of operating system domains (OSDs) for communication on a network, comprising:
    a port, for coupling to the network, configured to transceive packets with the network for each of the plurality of OSDs; and
    a plurality of replicated programming interfaces, coupled to said port, each configured to receive from a respective one of the plurality of OSDs a respective request to obtain a port ID for said port from the network, wherein each said respective request comprises one or more load-store transactions, wherein the shared controller obtains from the network a distinct port ID for said respective one of the plurality of OSDs in response to each said respective request, where a respective one of said plurality of replicated programming interfaces is mapped into a location in a system load-store memory map of said respective one of the plurality of OSDs, wherein each of said plurality of replicated programming interfaces is mappable by said respective one of the plurality of OSDs into said location in said system load-store memory map, wherein said location may be distinct in each said system load-store memory map.

2. The shareable controller as recited in claim 1, wherein said port transceives said packets with said network using said distinct port IDs obtained for each of the plurality of OSDs.

3. The shareable controller as recited in claim 2, wherein said port transceives said packets with said network using said distinct port IDs obtained for each of the plurality of OSDs in response to I/O operation requests programmed into said respective ones of said plurality of programming interfaces.

4. The shareable controller as recited in claim 1, wherein said request comprises a notification that said respective OSD has become active.

5. The shareable controller as recited in claim 1, wherein said load-store transactions comprise PCI Express transactions.

6. The shareable controller as recited in claim 1, wherein the shareable controller comprises a shareable Fibre Channel (FC) controller.

7. The shareable controller as recited in claim 6, wherein said port comprises a FC port for coupling to a FC network.

8. The shareable controller as recited in claim 7, wherein said packets comprise FC frames.

9. The shareable controller as recited in claim 8, wherein said distinct port IDs comprise distinct FC Nx_Port_IDs.

10. The shareable controller as recited in claim 9, wherein said FC port is configurable as a FC NL_Port for linking to a FC arbitrated loop.

11. The shareable controller as recited in claim 9, wherein said FC port comprises a FC N_Port for linking to a FC F_Port supporting a FC Multiple N_port_ID Assignment capability.

12. The shareable controller as recited in claim 11, wherein the shared controller obtaining from said network a distinct port ID comprises the shared controller obtaining from said FC F_Port a respective FC N_Port identifier for the OSD that requested the shareable controller to obtain a port ID.

13. A method for sharing a controller by a plurality of operating system domains (OSDs) for communication on a network, the controller having a ort for coupling to the network, configured to transceive packets with the network for each of the plurality of OSDs, and a plurality of replicated programming interfaces, the method comprising:
    receiving at each of the plurality of replicated programming interfaces from a respective one of the plurality of OSDs a respective request to obtain a port ID for said port from the network, wherein each said respective request comprises one or more load-store transactions;
    obtaining from the network a distinct port ID for each of the plurality of OSDs, in response to said receiving each of said respective requests and
    mapping a respective one of said plurality of replicated programming interfaces into a location in a system load-store memory map of said respective one of the plurality of OSDs, wherein each of said plurality of replicated programming interfaces is mappable by said respective one of the plurality of OSDs into said location in said system load-store memory map, wherein said location may be distinct in each said system load-store memory map.

14. The method as recited in claim 13, further comprising:
transceiving said packets with said network using said distinct port IDs obtained for each of the plurality of OSDs.

15. The method as recited in claim 13, wherein said load-store transactions comprise PCI Express transactions.

16. The method as recited in claim 13, wherein the shareable controller comprises a shareable Fibre Channel (FC) controller, wherein said port comprises a FC port for coupling to a FC network, wherein said packets comprise FC frames, wherein said distinct port IDs comprise distinct FC Nx_Port_IDs.

17. The method as recited in claim 16, wherein said FC port comprises a FC N_Port for linking to a FC F_Port supporting a FC Multiple N_Port_ID Assignment capability, wherein said obtaining from said network a distinct port ID comprises obtaining from said FC F_Port a respective FC N_Port identifier for the OSD that requested the shareable controller to obtain a port ID.

18. The method as recited in claim 13, further comprising:
determining that one of the plurality of OSDs has been reset; and
disclaiming the distinct port ID for the one of the plurality of OSDs that has been reset, in response to said determining.

19. The method as recited in claim 18, wherein said disclaiming the distinct port ID for the one of the plurality of OSDs that has been reset comprises logging out of a network to which the controller is linked for the distinct port ID for the one of the plurality of OSDs that has been reset.

20. A blade server environment comprising:
a plurality of blade servers;
a shared switch for coupling to the plurality of blade servers, and for providing communication between the plurality of blade servers and a downstream endpoint, the downstream endpoint comprising a controller shareable by the plurality of blade servers for communication on a network, said shared controller comprising:
a port, for coupling to the network, configured to transceive packets with the network for each of the plurality of blades; and
a plurality of replicated programming interfaces, coupled to said port, each configured to receive from a respective one of the plurality of blade servers a respective request to obtain a port ID for said port from the network, wherein each said respective request comprises one or more load-store transactions, wherein the shared controller obtains from the network a distinct port ID for said respective one of the plurality of blade servers in response to each said respective request, wherein a respective one of said plurality of replicated programming interfaces is mapped into a location in a system load-store memory map of sad respective one of the plurality of blade servers, wherein each of said plurality of.

21. The blade server environment as recited in claim 20, wherein said shared controller comprises a Fibre Channel controller shared by the plurality of blade servers via said plurality of replicated programming interfaces.

* * * * *

UNITED STATES PATENT AND TRADEMARK OFFICE
CERTIFICATE OF CORRECTION

PATENT NO. : 7,502,370 B2
APPLICATION NO. : 11/045869
DATED : March 10, 2009
INVENTOR(S) : Christopher J. Pettey It is certified that error appears in the above-identified patent and that said Letters Patent is hereby corrected as shown below:

Column 40, line 27, claim 20: please add the following text to the end of the claim before the period: "replicated programming interfaces is mappable by said respective one of the plurality of blade servers into said location in said system load-store memory map, wherein said location may be distinct in each said system load-store memory map"

Signed and Sealed this

Fourteenth Day of April, 2009

JOHN DOLL
*Acting Director of the United States Patent and Trademark Office*